US010749585B2

(12) United States Patent
Guo et al.

(10) Patent No.: US 10,749,585 B2
(45) Date of Patent: Aug. 18, 2020

(54) METHOD AND APPARATUS FOR BEAM MANAGEMENT REFERENCE SIGNALS IN WIRELESS COMMUNICATION SYSTEMS

(71) Applicant: Samsung Electronics Co., Ltd., Suwon-si, Gyeonggi-do (KR)

(72) Inventors: Li Guo, Allen, TX (US); Young-Han Nam, Plano, TX (US); Eko Onggosanusi, Coppell, TX (US); Taeyoung Kim, Suwon-si (KR); Gert-Jan van Lieshout, Apeldoorn (NL)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/536,156

(22) Filed: Aug. 8, 2019

(65) Prior Publication Data

US 2019/0393946 A1  Dec. 26, 2019

Related U.S. Application Data

(63) Continuation of application No. 15/706,495, filed on Sep. 15, 2017, now Pat. No. 10,425,139.
(Continued)

(51) Int. Cl.
*H04B 7/06* (2006.01)
*H04B 7/08* (2006.01)
(Continued)

(52) U.S. Cl.
CPC ......... *H04B 7/0617* (2013.01); *H04B 7/0626* (2013.01); *H04B 7/0695* (2013.01);
(Continued)

(58) Field of Classification Search
CPC .. H04B 7/0617; H04B 7/0626; H04B 7/0695; H04L 5/0007; H04L 5/0048; H04W 72/046

See application file for complete search history.

(56) References Cited

U.S. PATENT DOCUMENTS 9,755,800 B2 * 9/2017 Kim ...................... H04J 11/005
2014/0128109 A1 5/2014 Li et al.
(Continued)

FOREIGN PATENT DOCUMENTS

| KR | 10-2015-0072875 A | 6/2015 |
| WO | 2016086144 A1 | 6/2016 |
| WO | 2017023231 A1 | 2/2017 |

OTHER PUBLICATIONS

"ETSI Technical Specification; LTE; Evolved Universal Terrestrial Radio Access (E-UTRA); Physical Channels and Modulation, (3GPP TS 36.211 Version 13.0.0 Release 13)," ETSI TS 136 211, V13.0.0, Jan. 2016, 143 pages.
(Continued)

*Primary Examiner* — Freshteh N Aghdam

(57) ABSTRACT

A method of a user equipment (UE) for a beam management in a wireless communication system/The method comprises receiving, from a base station (BS), configuration information including information of receive (Rx) beam identifications (IDs) associated with Rx beams, receiving, from the BS, reference signals for determining the Rx beams, wherein the Rx beams include different Rx beam IDs, respectively, measuring, based on the Rx beams, a beam reference signal (BRS) and a channel state information-reference signal (CSI-RS) received from the BS, and performing, based on the configuration information, an Rx beam cycling operation for the Rx beams to receive downlink channels.

26 Claims, 23 Drawing Sheets

Related U.S. Application Data

(60) Provisional application No. 62/397,638, filed on Sep. 21, 2016, provisional application No. 62/404,580, filed on Oct. 5, 2016, provisional application No. 62/412,599, filed on Oct. 25, 2016, provisional application No. 62/421,039, filed on Nov. 11, 2016.

(51) Int. Cl.
*H04L 5/00* (2006.01)
*H04W 72/04* (2009.01)
*H04L 1/00* (2006.01)
*H04L 1/18* (2006.01)

(52) U.S. Cl.
CPC ........... *H04B 7/088* (2013.01); *H04L 5/0007* (2013.01); *H04L 5/0048* (2013.01); *H04W 72/046* (2013.01); *H04L 1/0026* (2013.01); *H04L 1/1812* (2013.01); *H04L 5/0053* (2013.01); *H04W 72/042* (2013.01)

(56) References Cited

U.S. PATENT DOCUMENTS

| | | | |
|---|---|---|---|
| 2015/0236774 | A1 | 8/2015 | Son et al. |
| 2015/0312927 | A1* | 10/2015 | Ko .................... H04W 72/1273 370/336 |
| 2015/0341105 | A1 | 11/2015 | Yu et al. |
| 2016/0006547 | A1* | 1/2016 | Kang .................. H04L 5/0048 370/329 |
| 2016/0248561 | A1 | 8/2016 | Davydov et al. |
| 2016/0285660 | A1 | 9/2016 | Frenne et al. |
| 2016/0360463 | A1 | 12/2016 | Kim |
| 2017/0006539 | A1 | 1/2017 | Kakishima et al. |
| 2017/0141894 | A1 | 5/2017 | Wei et al. |
| 2017/0257855 | A1* | 9/2017 | Park ........................ H04L 5/001 |
| 2017/0290046 | A1* | 10/2017 | Sun ...................... H04W 74/006 |
| 2018/0145807 | A1 | 5/2018 | Nagata et al. |
| 2018/0242300 | A1 | 8/2018 | Hakola et al. |
| 2018/0323852 | A1 | 11/2018 | Islam et al. |
| 2018/0359790 | A1 | 12/2018 | Ingale et al. |

OTHER PUBLICATIONS

"3rd Generation Partnership Project; Technical Specification Group Radio Access Network; Evolved Universal Terrestrial Radio Access (E-UTRA); Multiplexing and Channel Coding (Release 13)," 3GPP TS 36.212, V13.2.0, Dec. 2015, 121 pages.

"ETSI Technical Specification; LTE; Evolved Universal Terrestrial Radio Access (E-UTRA); Physical Layer Procedures, (3GPP TS 36.213 Version 13.0.0 Release 13)," ETSI TS 136 213, V13.0.0, May 2016, 328 pages.

"ETSI Technical Specification; LTE; Evolved Universal Terrestrial Radio Access (E-UTRA); Medium Access Control (MAC) Protocol Specification, (3GPP TS 36.321 Version 13.0.0 Release 13)," ETSI TS 136 321, V13.0.0, Feb. 2016, 84 pages.

"ETSI Technical Specification; LTE; Evolved Universal Terrestrial Radio Access (E-UTRA); Radio Resource Control (RRC) Protocol Specification, (3GPP TS 36.331 Version 13.0.0 Release 13)," ETSI TS 136 331, V13.0.0, Jan. 2016, 670 pages.

International Search Report and Written Opinion regarding International Application No. PCT/KR2017/010421, dated Jan. 16, 2018, 11 pages.

Extended European Search Report dated Jul. 8, 2019 regarding Application No. 17853442.6, 14 pages.

Qualcomm Incorporated, "Remaining details of EPDCCH Starting Symbol Configuration", 3GPP TSG-RAN WG1 #71, R1-125108, Nov. 2012, 3 pages.

* cited by examiner

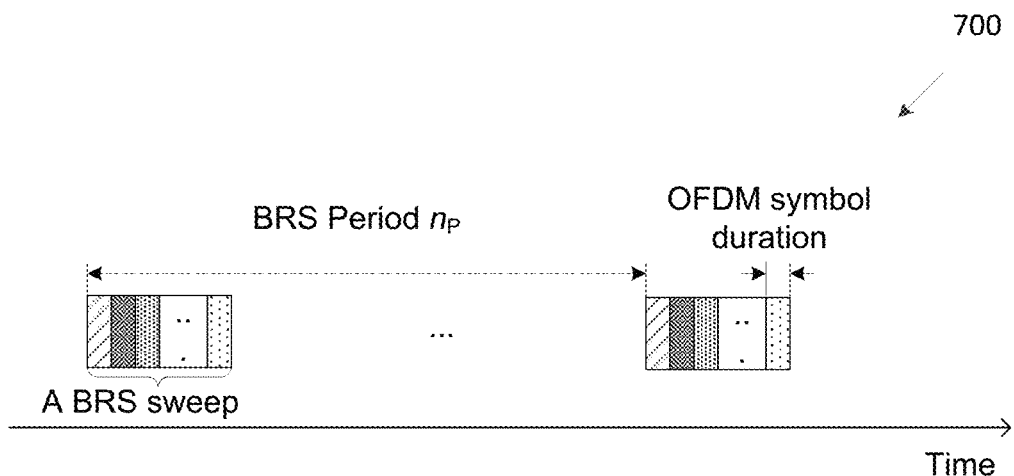
FIGURE 7
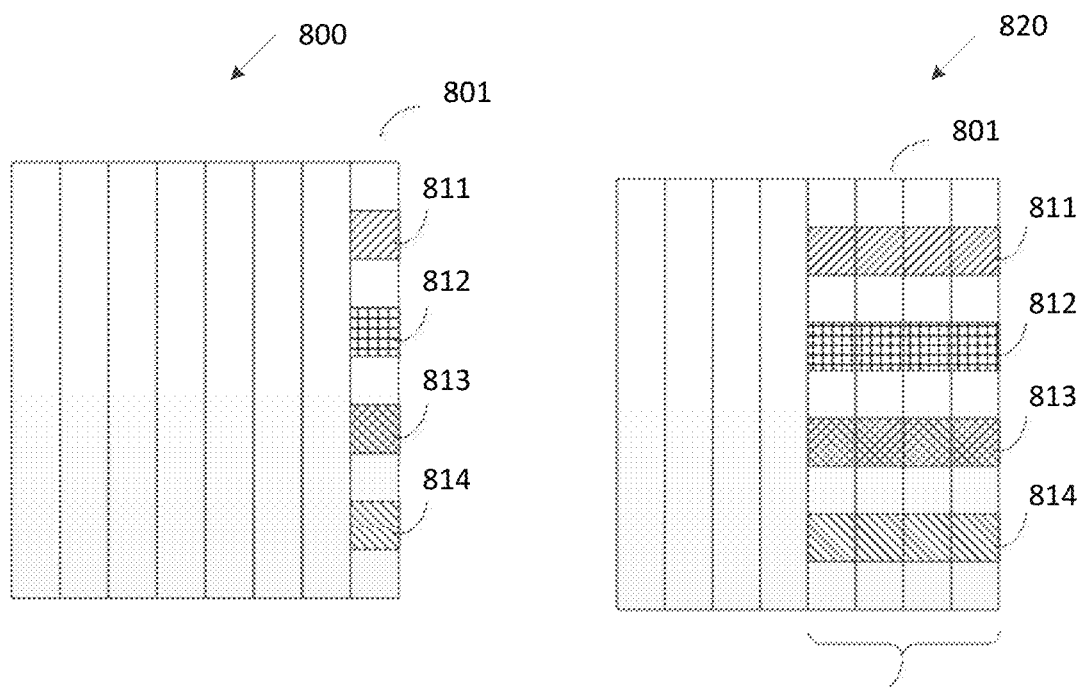
FIGURE 8A
FIGURE 8B

METHOD AND APPARATUS FOR BEAM MANAGEMENT REFERENCE SIGNALS IN WIRELESS COMMUNICATION SYSTEMS

CROSS-REFERENCE TO RELATED APPLICATIONS AND CLAIM OF PRIORITY

This application is a continuation of U.S. patent application Ser. No. 15/706,495, filed Sep. 15, 2017, U.S. Provisional Patent Application No. 62/397,638, filed Sep. 21, 2016; U.S. Provisional Patent Application No. 62/404,580, filed Oct. 5, 2016; U.S. Provisional Patent Application No. 62/412,599, filed Oct. 25, 2016; and U.S. Provisional Patent Application No. 62/421,039, filed Nov. 11, 2016. The contents of the above-identified patent documents are incorporated herein by reference.

TECHNICAL FIELD

The present application relates generally to beam management reference signals in wireless. More specifically, this disclosure relates to implicit and explicit signaling for beam management reference signal in wireless communication systems.

BACKGROUND

5th generation (5G) mobile communications, initial commercialization of which is expected around 2020, is recently gathering increased momentum with all the worldwide technical activities on the various candidate technologies from industry and academia. The candidate enablers for the 5G mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on. The International Telecommunication Union (ITU) has categorized the usage scenarios for international mobile telecommunications (IMT) for 2020 and beyond into 3 main groups such as enhanced mobile broadband, massive machine type communications (MTC), and ultra-reliable and low latency communications. In addition, the ITC has specified target requirements such as peak data rates of 20 gigabit per second (Gb/s), user experienced data rates of 100 megabit per second (Mb/s), a spectrum efficiency improvement of 3×, support for up to 500 kilometer per hour (km/h) mobility, 1 millisecond (ms) latency, a connection density of 106 devices/km2, a network energy efficiency improvement of 100× and an area traffic capacity of 10 Mb/s/m2. While all the requirements need not be met simultaneously, the design of 5G networks may provide flexibility to support various applications meeting part of the above requirements on a use case basis.

SUMMARY

The present disclosure relates to a pre-5th-Generation (5G) or 5G communication system to be provided for supporting higher data rates beyond 4th-Generation (4G) communication system such as long term evolution (LTE). Embodiments of the present disclosure provide multiple services in advanced communication systems.

In one embodiment, a user equipment (UE) for a beam management in a wireless communication system is provided. The UE includes a transceiver configured to receive, from a base station (BS), configuration information including information of receive (Rx) beam identifications (IDs) associated with Rx beams and receive, from the BS, reference signals for determining the Rx beams. The Rx beams include different Rx beam IDs, respectively. The UE further includes at least one processor configured to measure, based on the Rx beams, a beam reference signal (BRS) and a channel state information-reference signal (CSI-RS) received from the BS and perform, based on the configuration information, an Rx beam cycling operation for the Rx beams to receive downlink channels.

In another embodiment, a base station (BS) for a beam management in a wireless communication system is provided. The BS includes a transceiver configured to transmit, to a user equipment (UE), configuration information including information of receive (Rx) beam identifications (IDs) associated with Rx beams, wherein a beam reference signal (BRS) and a channel state information-reference signal (CSI-RS), transmitted from the BS, are measured based on the Rx beams and transmit, to the UE, the Rx beams associated with at least one of different orthogonal frequency division multiplexing (OFDM) symbols or different slots. The Rx beams include different Rx beam IDs, respectively and an Rx beam cycling operation is performed, at the UE, for the measured Rx beams based on the configuration information to receive downlink channels.

In yet another embodiment, a method of a user equipment (UE) for a beam management in a wireless communication system is provided. The method comprises receiving, from a base station (BS), configuration information including information of receive (Rx) beam identifications (IDs) associated with Rx beams, receiving, from the BS, reference signals for determining the Rx beams. The Rx beams include different Rx beam IDs, respectively, measuring, based on the Rx beams, a beam reference signal (BRS) and a channel state information-reference signal (CSI-RS) received from the BS, and performing, based on the configuration information, an Rx beam cycling operation for the Rx beams to receive downlink channels.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7 illustrates an example BRS transmission according to embodiments of the present disclosure;

FIG. 8A illustrates an example CSI-RS transmission according to embodiments of the present disclosure;

FIG. 8B illustrates another example CSI-RS transmission according to embodiments of the present disclosure;

DETAILED DESCRIPTION

FIG. 1 through FIG. 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 36.211 v13.0.0, "E-UTRA, Physical channels and modulation;" 3GPP TS 36.212 v13.0.0, "E-UTRA, Multiplexing and Channel coding;" 3GPP TS 36.213 v13.0.0, "E-UTRA, Physical Layer Procedures; and" 3GPP TS 36.331 v13.0.0, "Radio Resource Control (RRC) Protocol Specification."

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
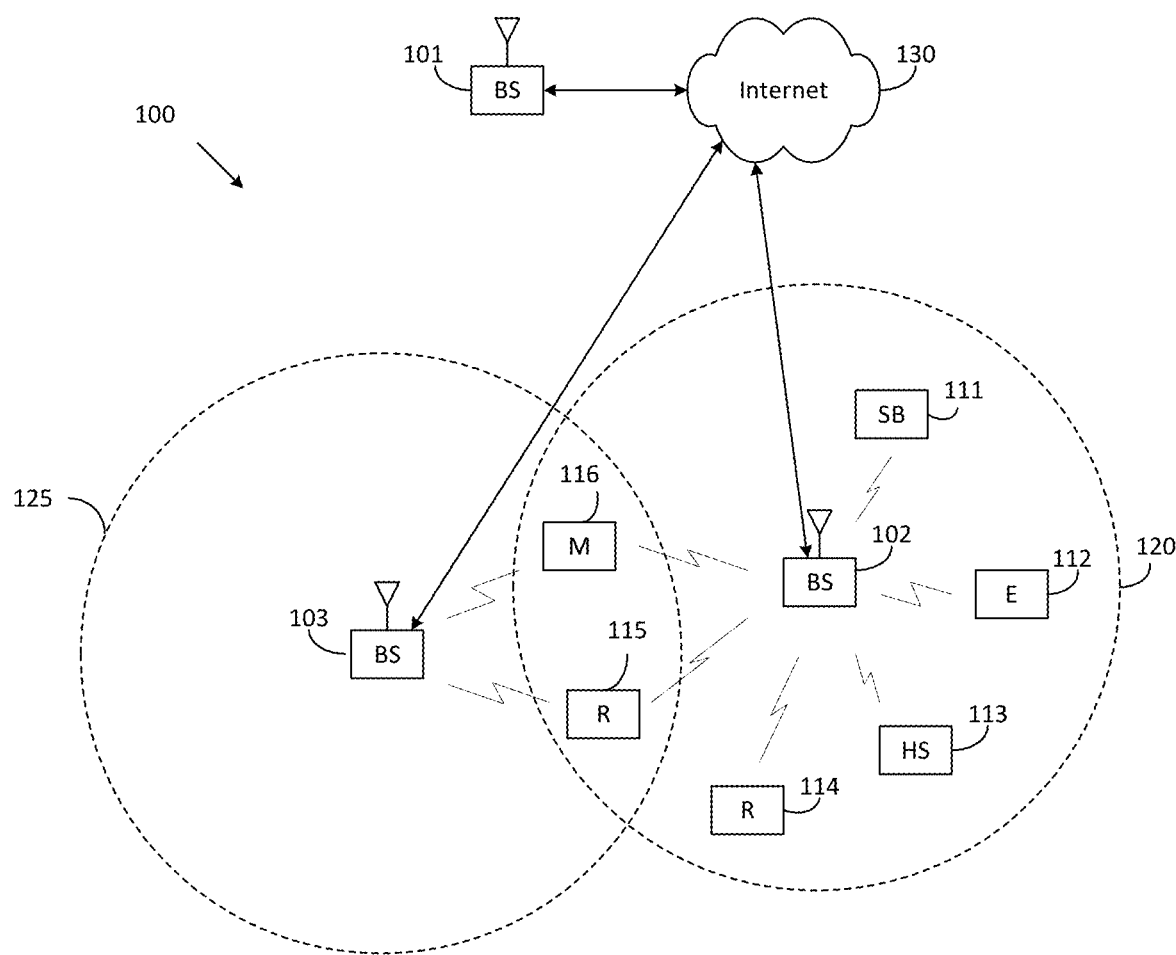
FIG. 1 illustrates an example wireless network according to embodiments of the present disclosure.
Figure 2:
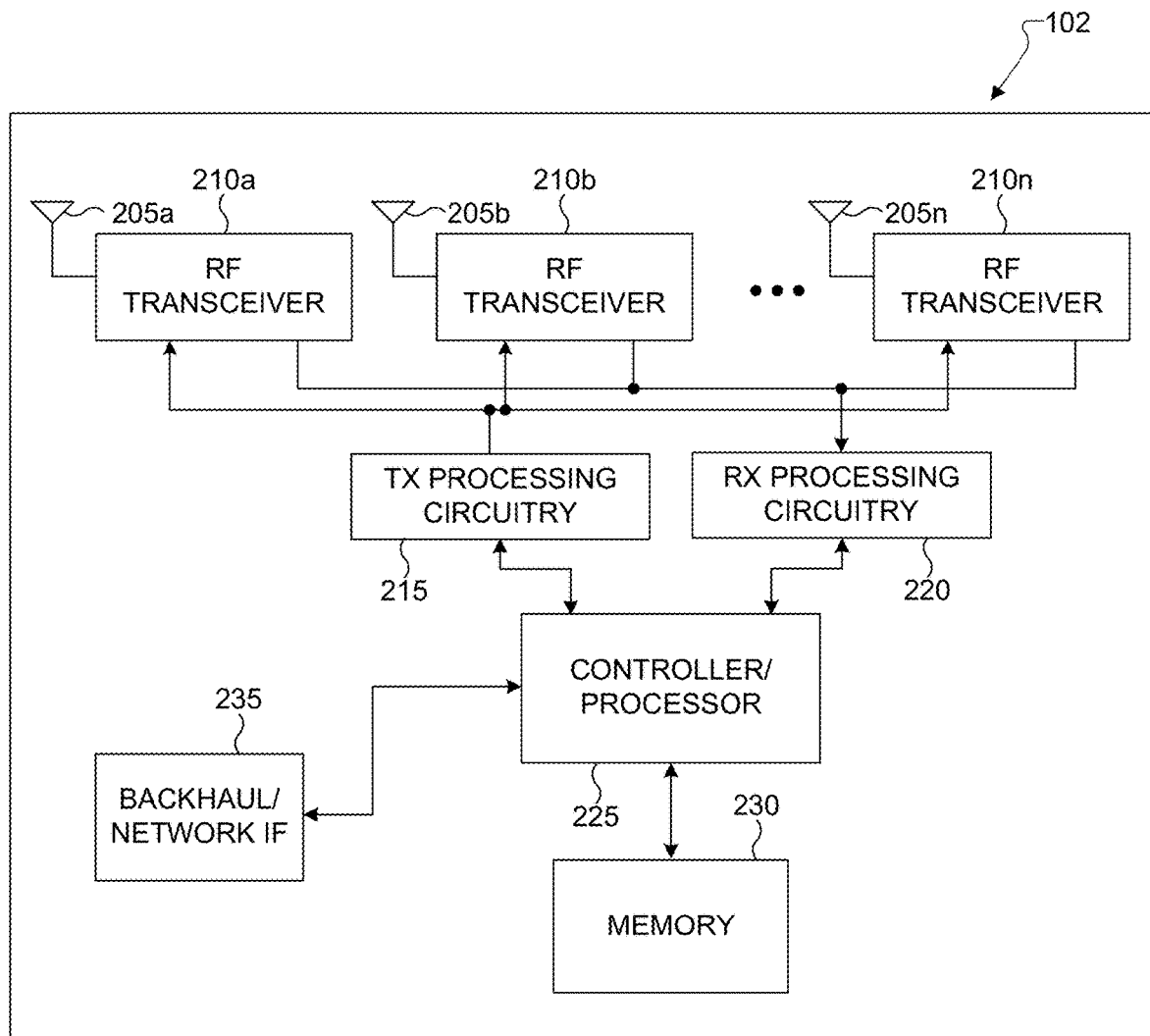
FIG. 2 illustrates an example eNB according to embodiments of the present disclosure.
Figure 3:
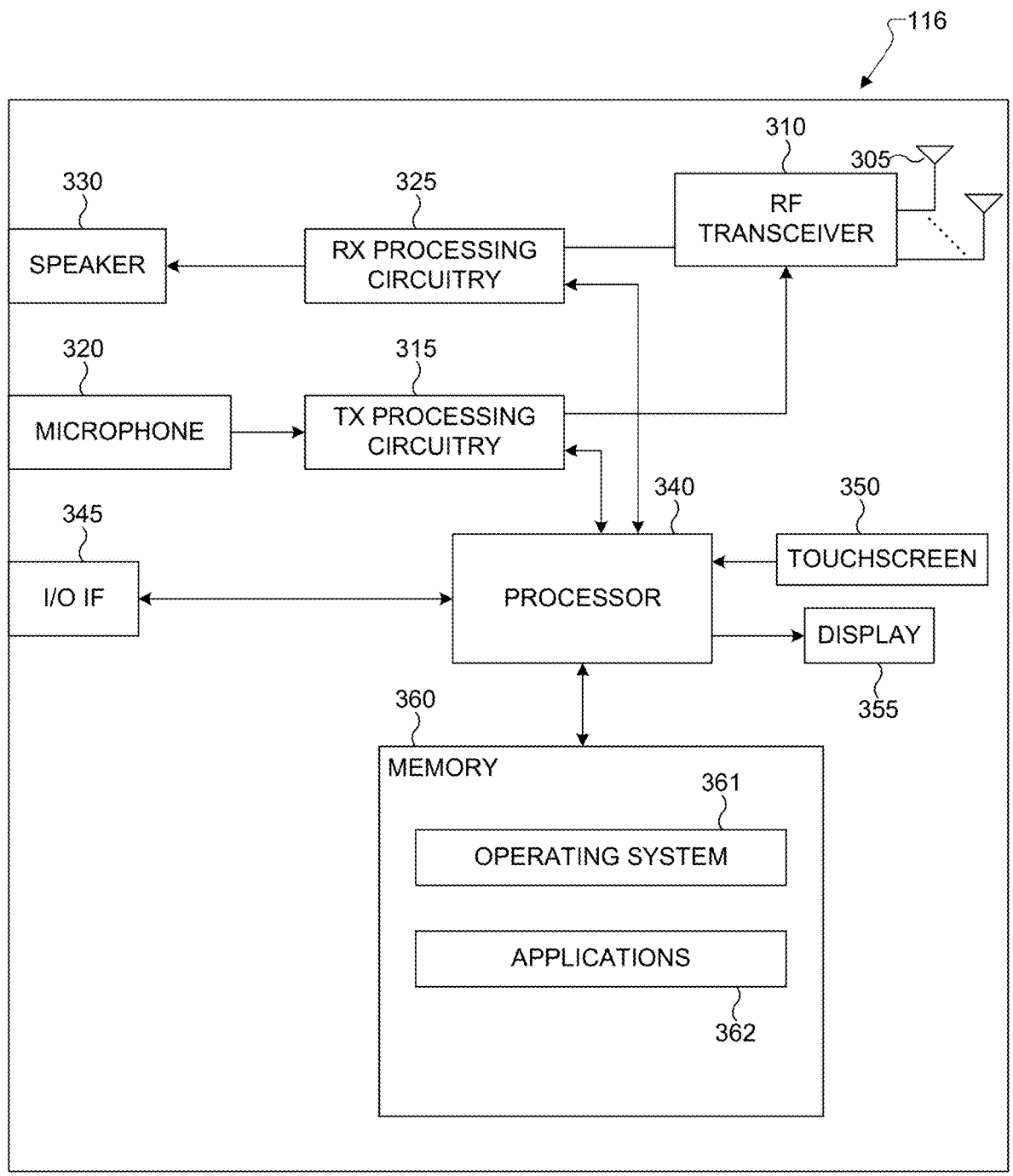
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programing, or a combination thereof, for efficient CSI reporting on PUCCH in an advanced wireless communication system. In certain embodiments, and one or more of the eNBs 101-103 includes circuitry, programing, or a combination thereof, for receiving efficient CSI reporting on PUCCH in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

In some embodiments, the RF transceiver 210a-201n is capable of transmitting configuration information including receive (Rx) beam identifications (IDs) associated with Rx beams and the Rx beams conveyed on different orthogonal frequency division multiplexing (OFDM) symbols In some embodiments, the RF transceiver 210a-201n is capable of transmitting the configuration information including a set of spatial quasi co-location (QCL) parameters associated with a reference signal (RS) resource and a group of RS resources.

In some embodiments, the RF transceiver 210a-201n is capable of receiving the Rx beams conveyed on different slots, the Rx beams including different Rx beam ID, respectively.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

In some embodiments, the RF transceiver 310 is capable of receiving configuration information including receive (Rx) beam identifications (IDs) associated with Rx beams and the Rx beams conveyed on different orthogonal frequency division multiplexing (OFDM) symbols, wherein the Rx beams include different Rx beam IDs, respectively.

In some embodiments, the RF transceiver 310 is capable of receiving the configuration information including a set of spatial quasi co-location (QCL) parameters associated with a reference signal (RS) resource and a group of RS resources.

In some embodiments, the RF transceiver 310 is capable of receiving the Rx beams conveyed on different slots, wherein the Rx beams include different Rx beam ID, respectively, included in the configuration information.

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

In some embodiments, the processor 340 is capable of measuring the Rx beams based on a beam reference signal (BRS) and a channel state information-reference signal (CSI-RS) received from the BS and performing an Rx beam cycling operation for the measured Rx beams to receive downlink channels.

In some embodiments, the processor 340 is capable of measuring the Rx beams based on the set of QCL parameters included in the configuration information.

In some embodiments, the processor 340 is capable of performing the Rx beam cycling operation over different OFDM symbols that are allocated to control channels and data channels and repeating the Rx beam cycling operation in multiple subframes for receiving the control channels.

In some embodiments, the processor 340 is capable of performing the Rx beam cycling operation over different OFDM symbols across multiple subframes and repeating the Rx beam cycling operation in the multiple subframes for receiving control channels.

In some embodiments, the processor 340 is capable of monitoring the downlink channels based on the received Rx beams conveyed on different slots.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
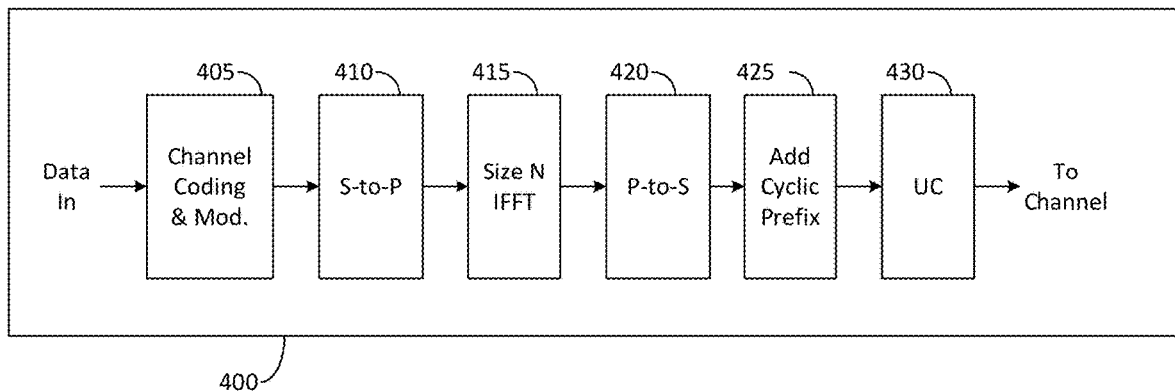
FIG. 4A illustrates an example high-level diagram of an orthogonal frequency division multiple access transmit path according to embodiments of the present disclosure.
Figure 4B:
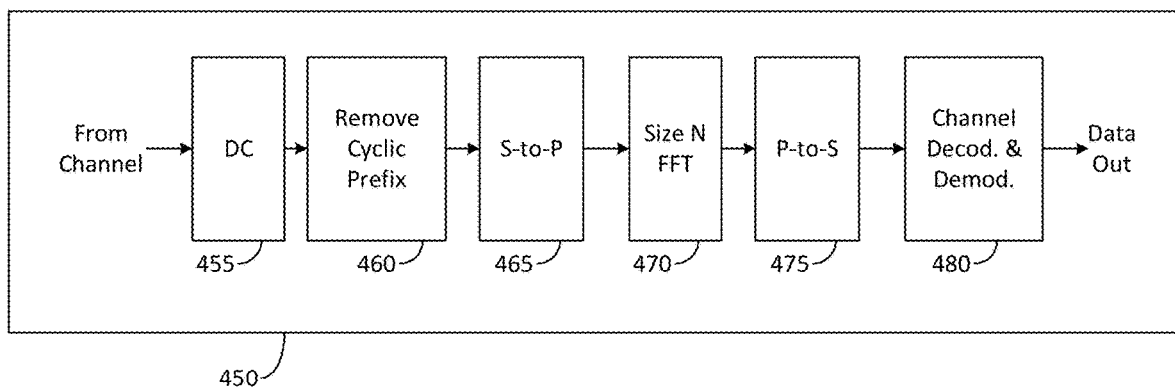
FIG. 4B illustrates an example high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

In LTE technologies, a time interval X which can contain one or more of the DL transmission part, guard, UL transmission part, and a combination of thereof regardless of they are indicated dynamically and/or semi-statically. Furthermore, in one example, the DL transmission part of time interval X contains downlink control information and/or downlink data transmissions and/or reference signals. In another example, the UL transmission part of time interval X contains uplink control information and/or uplink data transmissions and/or reference signals. In addition, the usage of DL and UL does not preclude other deployment scenarios e.g., sidelink, backhaul, relay). In some embodiments of the current disclosure, "a subframe" is another name to refer to "a time interval X," or vice versa. In order for the 5G network to support these diverse services are called network slicing.

In some embodiments, "a subframe" and "a time slot" can be used interchangeably. In some embodiments, "a subframe" refers to a transmit time interval (TTI), which may comprise an aggregation of "time slots" for UE's data transmission/reception.

Figure 5:
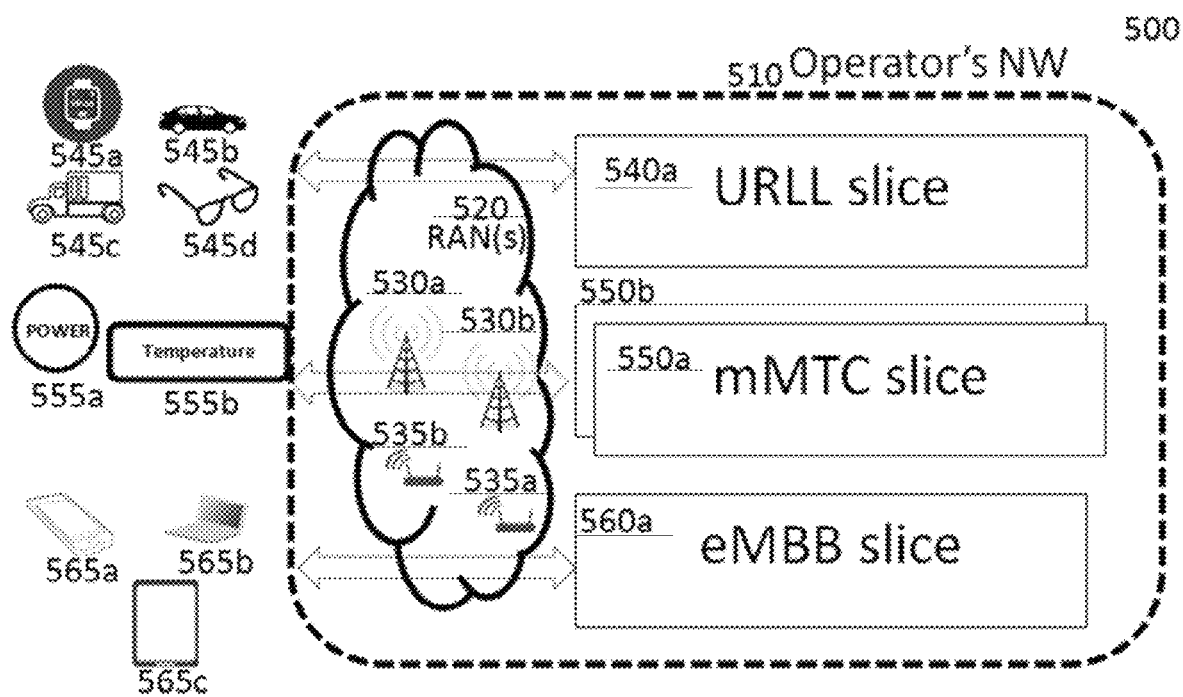
FIG. 5 illustrates an example network slicing according to embodiments of the present disclosure.

FIG. 5 illustrates a network slicing 500 according to embodiments of the present disclosure. An embodiment of the network slicing 500 shown in FIG. 5 is for illustration only. One or more of the components illustrated in FIG. 5 can be implemented in specialized circuitry configured to perform the noted functions or one or more of the components can be implemented by one or more processors executing instructions to perform the noted functions. Other embodiments are used without departing from the scope of the present disclosure.

As shown in FIG. 5, the network slicing 500 comprises an operator's network 510, a plurality of RANS 520, a plurality of eNBs 530a, 530b, a plurality of small cell base stations 535a, 535b, a URLL slice 540a, a smart watch 545a, a car 545b, a truck 545c, a smart glasses 545d, a power 555a, a temperature 555b, an mMTC slice 550a, an eMBB slice 560a, a smart phone (e.g., cell phones) 565a, a laptop 565b, and a tablet 565c (e.g., tablet PCs).

The operator's network 510 includes a number of radio access network(s) 520—RAN(s)—that are associated with network devices, e.g., eNBs 530a and 530b, small cell base stations (femto/pico eNBs or Wi-Fi access points) 535a and 535b, etc. The operator's network 510 can support various services relying on the slice concept. In one example, four slices, 540a, 550a, 550b and 560a, are supported by the network. The URLL slice 540a to serve UEs requiring URLL services, e.g., cars 545b, trucks 545c, smart watches 545a, smart glasses 545d, etc. Two mMTC slices 550a and 550b serve UEs requiring mMTC services such as power meters and temperature control (e.g., 555b), and one eMBB slice 560a requiring eMBB serves such as cells phones 565a, laptops 565b, tablets 565c.

In short, network slicing is a method to cope with various different qualities of services (QoS) in the network level. For supporting these various QoS efficiently, slice-specific PHY optimization may also be necessary. Devices 545a/b/c/d, 555a/b are 565a/b/c examples of user equipment (UE) of different types. The different types of user equipment (UE) shown in FIG. 5 are not necessarily associated with particular types of slices. For example, the cell phone 565a, the laptop 565b and the tablet 565c are associated with the eMBB slice 560a, but this is just for illustration and these devices can be associated with any types of slices.

In some embodiments, one device is configured with more than one slice. In one embodiment, the UE, (e.g., 565a/b/c) is associated with two slices, the URLL slice 540a and the eMBB slice 560a. This can be useful for supporting online gaming application, in which graphical information are transmitted through the eMBB slice 560a, and user interaction related information are exchanged through the URLL slice 540a.

In the current LTE standard, no slice-level PHY is available, and most of the PHY functions are utilized slice-agnostic. A UE is typically configured with a single set of PHY parameters (including transmit time interval (TTI) length, OFDM symbol length, subcarrier spacing, etc.), which is likely to prevent the network from (1) fast adapting to dynamically changing QoS; and (2) supporting various QoS simultaneously.

In some embodiments, corresponding PHY designs to cope with different QoS with network slicing concept are disclosed. It is noted that "slice" is a terminology introduced just for convenience to refer to a logical entity that is associated with common features, for example, numerology, an upper-layer (including medium access control/radio resource control (MAC/RRC)), and shared UL/DL time-frequency resources. Alternative names for "slice" include virtual cells, hyper cells, cells, etc.

Figure 6:
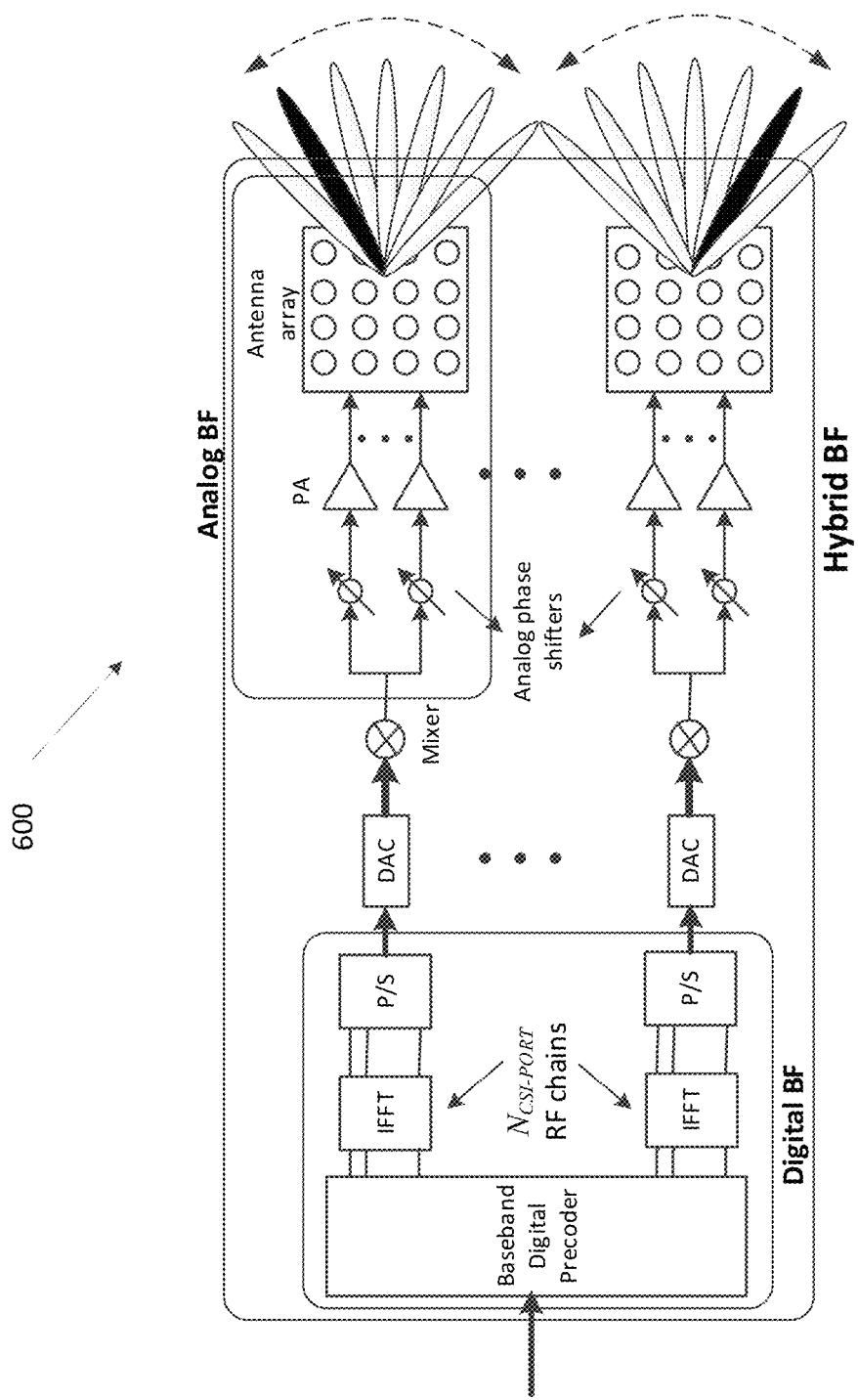
FIG. 6 illustrates an example number of digital chains according to embodiments of the present disclosure.

FIG. 6 illustrates an example number of digital chains 600 according to embodiments of the present disclosure. An embodiment of the number of digital chains 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

LTE specification supports up to 32 channel state information-reference signal (CSI-RS) antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 6. In this case, one CSI-RS port is mapped onto a large number of antenna elements which can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or subframes. The number of sub-arrays (equal to the number of RF chains) is the same as the number of CSI-RS ports $N_{CSI-PORT}$. A digital beamforming unit 610 performs a linear combination across $N_{CSI-PORT}$ analog beams to further increase precoding gain. While analog beams are wideband (hence not frequency-selective), digital precoding can be varied across frequency sub-bands or resource blocks.

Some embodiments of the present disclosure are described assuming cellular DL communications. However, the same/similar principles and related signaling methods and configurations can also be used for cellular UL & sidelink (SL) communications.

In some embodiments, the beam management is based on one or more than one of the followings: beam reference signal (BRS); channel state information RS (CSI-RS); and Both BRS and CSI-RS.

In some embodiments, BRS may correspond to beam measurement reference signal (BMRS) or a certain type of synchronization signals (SS) or secondary synchronization signals (SSS). In such embodiments, a subset of BRS antenna ports corresponds to SSS. In one example, BRS is transmitted on $N_{BRS}$ antenna ports, among which a first antenna port corresponds to an antenna port of SSS. In another example, a first and a second antenna ports corresponds to a first and a second antenna ports of SSS.

In some embodiments, the configuration of BRS is cell-specific and the transmission of BRS is periodic. The configuration of CSI-RS is UE-specific and the transmission of CSI-RS is periodic or aperiodic. In this case, UE is configured to receive CSI-RS either periodically or aperiodically.

In some embodiments, the UE is configured to operate the beam management procedure with one of the following operation modes. In each of the mode, the UE is configured to use configured RS(s) for the beam management procedures. In one example, the BRS is used for beam management procedure. In another example, the BRS is used for beam management procedure P-1, and the CSI-RS is used for beam management procedure. In another example, the BRS is used for beam management procedure. The CSI-RS is used for beam management procedure. In yet another example, the CSI-RS is used for beam management procedure.

In some embodiments, the BRS transmission is turned on or off through some implicit or explicit signaling. When BRS is turned on, the UE is configured to use at least one of the first, the second and the third modes; the UE receive BRS and process the BRS for L3 mobility and beam management and the UE may be further configured to perform initial beam alignment relying on BRS before receiving the RRC connection message. The UE can be further indicated to use a certain mode out of those three modes.

When BRS is turned off the UE is configured to use the fourth mode, and use the CSI-RS for beam management; for L3 mobility, the UE can be configured to use SS. The on/off of BRS can be indicated implicitly or explicitly through one or more of the following embodiments. In one embodiment, through the carrier frequency, if the carrier frequency is below a first predefined carrier frequency threshold (e.g., 6 GHz), the BRS is off; if the carrier frequency is above a first predefined carrier frequency threshold, the BRS is on. In one instance, a set of carrier frequencies is predefined. If the carrier frequency falls into the predefine set, the BRS in on; otherwise, the BRS is off.

In another embodiment, through the mapping method of initial access signals and, synchronization signals and nrPBCH, if the synchronization signals and nrPBCH are multiplexed through TDM, it is indicated that the BRS is turned off. If the synchronization signals and nrPBCH are multiplexed through FDM, it is indicated that the BRS is turned on.

In yet another embodiment, through the sequence ID of certain initial synchronization signals, the sequence ID of PSS is used to indicate the on/off of BRS. The sequence IDs of PSS are divided into two subsets, a first subset and a second subset. The UE is configured to determine if the BRS is on or off based on one detected sequence ID of PSS. If the detected sequence ID belongs to a first subset, the UE determines that the BRS is on. If the detected sequence ID belongs to a second subset, the UE determines that the BRS is off. In one method, the sequence ID of SSS is used to indicate the on/off of BRS.

In yet another embodiment, through the physical cell ID to indicate the on/off of the BRS, the physical cell IDs are divided into two subset, a first subset and a second subset. The UE is configured to determine of the BRS is on or off based on the detected physical cell ID.

In yet another example, through the index of OFDM symbol on which the synchronization signals are detected by the UE, a predefined special OFDM index (e.g., the last OFDM or first OFDM or a predefined OFDM index in initial access subframe) indicates that the BRS is off. If the UE detects the synchronization signal on that predefined special OFDM index, the UE determines that the BRS is off. If the UE detects the synchronization signal on other OFDM symbol(s), the UE determines that the BRS is on.

In yet another embodiment, 1-bit field in nrPBCH explicitly indicates that the BRS is on or off.

In yet another embodiment, 1-bit field in nrSIB explicitly indicates that BRS is on or off.

In yet another embodiment, the number of beam IDs implicitly indicates that the BRS is on or off. In one instance, if the number of beam IDs is 1, the BRS is on. If the number of beam ID is >1, the BRS is off.

In yet another embodiment, the configuration of RACH implicitly indicates that the BRS is on or off. In one instance, the configuration of RACH could indicate that TRP Rx beam sweeping is applied to the uplink RACH resources and that indicates implicitly that the BRS is on. In another instance, the configuration of RACH does not indicate that TRP Rx beam sweeping is applied to the uplink RACH resources and that indicates implicitly that the BRS is off. The UE is configured to determine the on/off of the BRS according to the configuration of RACH.

In yet another embodiment, 1-bit field in RAR (random access response) is used. In yet another embodiment, 1-bit filed in msg4 is used in random access procedure. In yet another embodiment, the RRC configuration message is used. If the BRS is turned off, the UE is configured to use CSI-RS to do the beam management. If the BRS is on, the UE is configured to use BRS or both BRS and CSI-RS to do the beam management.

In some embodiments, the configuration of BRS is cell-specific and the BRS is transmitted periodically.

FIG. 7 illustrates an example BRS transmission 700 according to embodiments of the present disclosure. An embodiment of the BRS transmission 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

FIG. 7 illustrates BRS transmissions according to some embodiments of the present disclosure. The BRS are mapped on the l consecutive OFDM symbols, and this BRS burst during the l consecutive OFDM symbols is referred to be a BRS sweep in this disclosure. The BRS sweep transmissions are repeated with a period $n_p$ subframes or time slots. The configuration of BRS includes one or more than one of the following parameters: number of consecutive OFDM symbols l; the BRS sweep transmission repeating period $n_p$ subframes or time slots; a number of antenna ports $N_p$ for the BRS; the number of beam IDs; the configuration of beam ID; or The configuration of beam cluster, $N_c$ beam clusters for a cell.

In some embodiments, the configuration of BRS could be configured by a BRS configuration index. A BRS configuration index is signaled implicitly or explicitly to a UE. The UE is configured to calculate the BRS configuration according to the received BRS configuration index. In one method, BRS configuration is done according to TABLE 1. The BRS configuration index in the leftmost column maps to at least one property in the rest of the columns. In one example, the BRS configuration index maps to all the properties in the rest of the columns. In another example, the BRS configuration index maps to all the properties except for the BRS transmission period, which is a constant, and fixed in a standards specification for a given deployment scenario (e.g., carrier frequency). In yet another example, "number of OFDM symbols" may be replaced with "number of beam sweeping units," in which a beam sweeping unit refers to a number of consecutive OFDM symbols, e.g., 2, 4, 5, 6, 7, 8, 12, 14, 16.

TABLE 1

| BRS configuration | | | | | | | |
|---|---|---|---|---|---|---|---|
| BRS configuration index | Number of OFDM symbols l | BRS transmission period $n_p$ | Number of antenna ports $N_p$ | Number of beam IDs | Configuration of beam ID | $N_c$ beam clusters | Notes |
| 0 | 14 | 100 | 4 | 4 × 14 | 0 | | 2 |
| 1 | 7 | 50 | 2 | 2 × 7 | 0 | | 4 |

In some embodiments, a set of Q≥1 BRS configurations is predefined. The UE is configured to blindly detect which one of those Q≥1 BRS configurations is used by the TRP. The set of Q≥1 BRS configurations could be common to all carrier frequency or carrier frequency-specific. In some embodiments, multiple sets of BRS configurations are predefined. The index of BRS configuration set is signaled to the UE and the UE is configured to blindly detect the BRS configuration according to the received set index. The signaling to indicate the set index can be conveyed in nrPBCH (or MIB) or ePBCH (or SIB) or RAR or msg4 of random access procedure or via RRC signaling.

In some embodiments, a UE is configured to use a BRS configuration according to the carrier frequency. In one method, if the carrier frequency is below a first predefined carrier frequency threshold (e.g., 6 GHz), the UE uses a first BRS configuration; if the carrier frequency is above a first predefined carrier frequency threshold, and the UE uses a second BRS configuration.

In some embodiments, the BRS is configured cell-specifically. The BRS configuration could be conveyed implicitly or explicitly by one or more than one of the following methods: in nrPBCH (or MIB); in ePBCH (or SIB) that is detected by the UE before random access procedure; in RAR (random access response); in msg4 of random access procedure; or via RRC signaling The UE is configured to measure the beam-specific RSRP for the beam management procedure. Beam-specific reference signal received power (RSRP) for beam b, is defined as the average over the power contributions (in [W]) of the resource elements that carry beam-specific reference signals (BRS) corresponding to beam b, within the considered measurement frequency bandwidth. The UE is configured to report the beam state information of $N_b$ best beams. One method of beam state information is the $N_b$ pair {beam ID, beam-specific RSRP} of the beams with the strongest beam-specific RSRP.

In some embodiments, the UE can report the beam state information in nrPUSCH or nrPUCCH. The UE can report the beam state information according to the TRP's indication or according to a triggering mechanism/condition. In one example, the TRP could use signal in MAC-CE or L1 signaling (e.g., DCI) to indicate the UE to report the beam state information in nrPUSCH. In another example, the TRP could use signal in L1 signaling (DCI) to indicate the UE to report the beam state information in nrPUCCH and the resource of nrPUCCH is scheduled in the same DCI or configured via RRC signaling.

In some embodiments, the UE can be configured with a beam ID corresponding to BRS antenna port(s) on a certain OFDM symbol, which is quasi co-location (QCL) in angle of arrivals (or UE Rx beam) with the subsequent PDSCH/DMRS unless otherwise indicated in the DCI. This is very useful for the UE to receive the downlink transmission PDCCH and PDSCH before the RRC connection is built and the fine beam alignment is built through the beam management procedure. The beam ID can be explicitly indicated by the gNB, or implicitly obtained through one or more of the followings.

In such embodiments, a beam ID may refer to a BRS antenna port on an OFDM symbol, whose relation is defined by a beam ID to (a BRS port, OFDM symbol) mapping. Alternatively, a beam ID may refer to an OFDM symbol number of nrSSS, nrPBCH, and nrPBCH antenna port.

When a beam ID is QCL'ed with an antenna port of another type, the UE is configured to use the Rx beam that can best receive the beam corresponding to the beam ID, for receiving the antenna port of another type. Antenna ports of another type may include PDSCH, PDSCH DMRS, PDCCH, PDCCH DMRS, CSI-RS, etc.

In one example, the UE is configured to use (or may assume) beam ID i being QCL'ed in angle of arrival with either PDCCH/PDCCH DMRS antenna ports or PDSCH/PDSCH DMRS antenna ports or both. The beam ID i is the beam with the largest beam quality the UE measured from the initial access signal, e.g., initial synchronization signals, nrPSS, nrSSS or nrPBCH, or BRS. In another example, the UE could report the beam ID i through the RACH resources index that the UE selects for random access preamble transmission, through the random access preamble sequence ID or through msg3 of RACH procedure.

In yet another example, the TRP can signal one Tx beam ID i in the RAR (random access response) to the UE who transmit the corresponding random access preamble sequence. The UE who has finished the RACH procedure can be configured to use the beam ID i indicated in the RAR message that was the received during the RACH procedure for this UE. The beam ID i is used as QCL in angle of arrivals with the subsequence PDSCH/DRMS and/or PDCCH demodulation.

In yet another example, the TRP can signal one Tx beam ID i in the msg4 (i.e., the contention resolution message) of RACH procedure. The UE is configured to use the Tx beam ID i as QCL in angle of arrivals with the subsequent PDSCH/DMRS and/or PDCCH transmission In yet another example, one Tx beam ID i is signaled in DCI or MAC-CE to the UE and the UE is configured to use the Tx beam ID as QCL in angle of arrivals for PDSCH/DMRS and/or PDCCH.

In some embodiments, the same Tx beam ID is used as QCL in angle of arrivals for both PDCCH and PDSCH/DMRS. One or more than one of the previous methods can be used to indicate one Tx beam ID to the UE.

In some embodiments, the Tx beam IDs used as QCL in angle of arrivals for PDCCH and PDSCH/DMRS can be different and can be signaled separately. In one example, the Tx beam ID used for PDCCH can be signaled implicitly through the aforementioned embodiments, and the Tx beam ID used for PDSCH/DMRS can be signaled explicitly as described in the aforementioned embodiments.

In another example, the Tx beam ID used for PDCCH can be signaled explicitly through a second method described previously, and the Tx beam ID used for PDSCH/DMRS can be signaled explicitly as described in the aforementioned embodiments.

In yet another example, the Tx beam ID used for PDCCH can be signaled explicitly through the aforementioned embodiments and the Tx beam ID used for PDSCH/DMRS can be signaled explicitly through the aforementioned embodiments.

In yet another example, the Tx beam ID used for PDCCH can be signaled explicitly through the aforementioned embodiments, and the Tx beam ID used for PDSCH/DMRS can be signaled explicitly through the aforementioned embodiments. The DCI indication of beam ID(s) that is/are QCL in angle of arrivals with the PDSCH/DMRS can be configured on/off by RRC.

In some embodiments, the UE is configured to measure the beams for beam management based on CSI-RS. The CSI-RS is configured UE-specifically. The transmission of CSI-RS is aperiodic. The transmission of CSI-RS can be periodic or time-limited periodic.

In some embodiments, a CSI-RS configuration may at least contain the following components. In one example, there are $N_{proc} \geq 1$ CSI-RS processes. In one instance, the CSI-RS processes can be numbered as $n_{proc} = \{1, 2, \ldots, N_{proc}\}$. The CSI-RS processes can be numbered by $n_{proc} = \{0, 1, \ldots, N_{proc}-1\}$. In another example, in each CSI-RS process $n_{proc}$, there are $K_{n_{proc}} \geq 1$ CSI-RS resources. In one instance, the CSI-RS resources are indexed by $= \{1, 2, \ldots, K_{n_{proc}}\}$. The CSI-RS resources can be indexed by $k = \{0, 1, \ldots, K_{n_{proc}}-1\}$. Each CSI-RS resource is configured with $p_k$ CSI-RS antenna ports. In another instance, each CSI-RS resource correspond to one TRP Tx beam ID. In yet another example, the UE Rx beam sweeping capability of CSI-RS resource. In one instance, number of time repetitions $M_{RX} \geq 1$ is configured for the UE to Rx beam selection.

FIG. 8A illustrates an example CSI-RS transmission 800 according to embodiments of the present disclosure. An embodiment of the CSI-RS transmission 800 shown in FIG. 8A is for illustration only. One or more of the components illustrated in FIG. 8A can be implemented in specialized circuitry configured to perform the noted functions or one or more of the components can be implemented by one or more processors executing instructions to perform the noted functions. Other embodiments are used without departing from the scope of the present disclosure.

An example of CSI-RS is illustrated in FIG. 8A. In one example, one CSI-RS process 801 has $K_{n_{proc}}=4$ CSI-RS resources 811, 812, 813, and 814. Each CSI-RS resource corresponds to one TRP Tx beam. In the example of FIG. 8A, the CSI-RS resource only has one repetition in time.

FIG. 8B illustrates another example CSI-RS transmission 820 according to embodiments of the present disclosure. An embodiment of the CSI-RS transmission 820 shown in FIG. 8B is for illustration only. One or more of the components illustrated in FIG. 8B can be implemented in specialized circuitry configured to perform the noted functions or one or more of the components can be implemented by one or more processors executing instructions to perform the noted functions. Other embodiments are used without departing from the scope of the present disclosure.

An example of CSI-RS is illustrated in FIG. 8B. In one example, one CSI-RS process 801 has $K_{n_{proc}}=4$ CSI-RS resources 811, 812, 813, and 814. Each CSI-RS resource corresponds to one TRP Tx beam. In the example of FIG. 8B, the CSI-RS resource has $M_{Rx}=4$ repetitions in time 830. The time repetitions allow the UE to sweep up to 4 Rx beams over the same CSI-RS resource to select the best Rx beam.

Figure 8C:
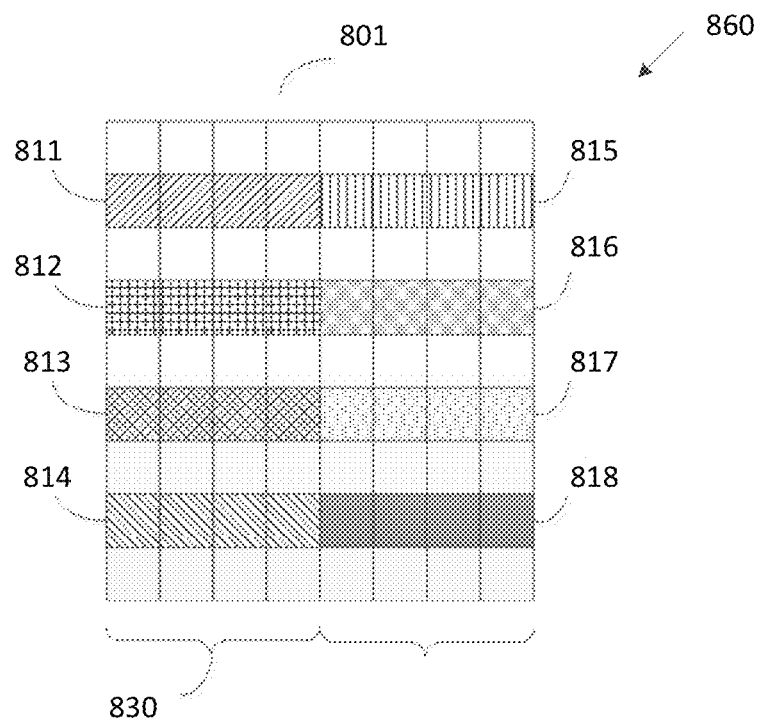
FIG. 8C illustrates yet another example CSI-RS transmission according to embodiments of the present disclosure.

FIG. 8C illustrates yet another example CSI-RS transmission 860 according to embodiments of the present disclosure. An embodiment of the CSI-RS transmission 860 shown in FIG. 8C is for illustration only. One or more of the components illustrated in FIG. 8C can be implemented in specialized circuitry configured to perform the noted functions or one or more of the components can be implemented by one or more processors executing instructions to perform the noted functions. Other embodiments are used without departing from the scope of the present disclosure.

Figure 8D:
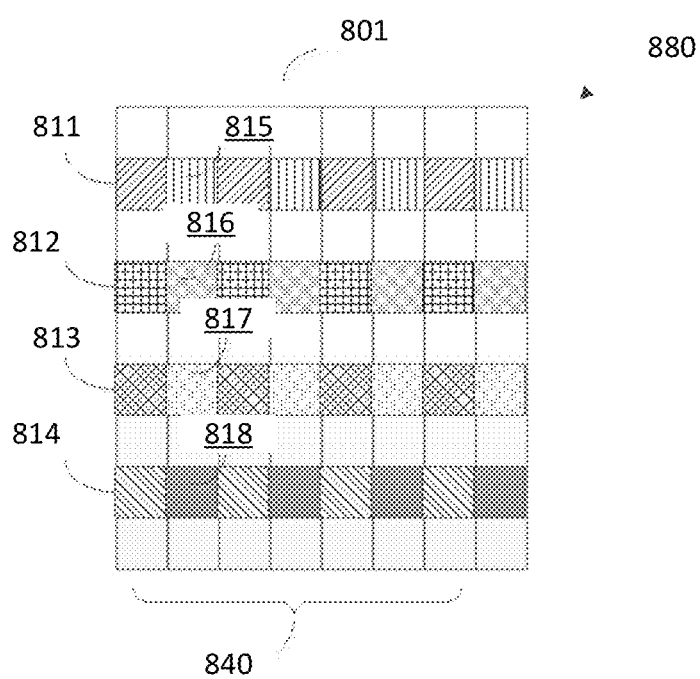
FIG. 8D illustrates yet another example CSI-RS transmission according to embodiments of the present disclosure.

FIG. 8D illustrates yet another example CSI-RS transmission 880 according to embodiments of the present disclosure. An embodiment of the CSI-RS transmission 880 shown in FIG. 8D is for illustration only. One or more of the components illustrated in FIG. 8D can be implemented in specialized circuitry configured to perform the noted functions or one or more of the components can be implemented by one or more processors executing instructions to perform the noted functions. Other embodiments are used without departing from the scope of the present disclosure.

The time repetition of CSI-RS resource can have two different methods for the time-repetitions. In one example, contiguous repetition and scattered repetition are considered. Examples are shown in FIGS. 8C and 8D. In FIG. 8C, the CSI-RS process 901 is configured with 8 CSI-RS resources 811-818 and each of the CSI-RS resources has $M_{RX}=4$ contiguous time repetitions 830. In FIG. 8D, each of CSI-RS resources has $M_{RX}=4$ scattered time repetitions 840.

In one embodiment, $N_{proc}$ CSI-RS processes and K CSI-RS in each CSI-RS are UE-specifically configured. The UE is configured to measure $K \times N_{proc}$ beam-strength values, one CSI-RS resource per CSI-RS process. In another embodiment, the beam ID corresponding to the CSI-RS resource $k=\{0,1, \ldots, K\}$ in CSI-RS process $n=\{0,1, \ldots, N_{proc}\}$ is calculated as $n \times K + k$. In yet another embodiment, the beam ID corresponding to the CSI-RS resource $k=\{0,1, \ldots, K_{n_{proc}}\}$ in CSI-RS process $n_{proc}=\{0,1, \ldots, N_{proc}\}$ is identified by pair of {CSI-RS process number $n_{proc}$, CSI-RS resource number k}.

The configuration of CSI-RS can be signaled via RRC signaling. The MAC-CE or L1 signaling (e.g., DCI) can be used to trigger the transmission of CSI-RS and configure the UE to measure and report the beam-strength information. A subset of one or more than one CSI-RS processes of all the CSI-RS processes configured in the CSI-RS configuration can be signaled in the MAC-CE or L1 signaling for the UE to measure.

In one embodiment, the UE is configured to measure all the CSI-RS resources contained in the subset of CSI-RS processes signaled in MAC-CE or L1 signaling. The UE is configured to measure the beam-specific RSRP, RSRQ, CQI, PMI, RI, CSI of all indicated CSI-RS resources. In another embodiment, the UE is configured to report the CSI-beam state information of the best $N_p$ beams with the largest beam-specific RSRP among all the indicated beam ID or CSI-RS resources. In yet another embodiment, the UE is configured to report the CSI-beam state information of all indicated beam IDs or CSI-RS resources.

In some embodiments, the CSI-beam state information that the UE is configured to report includes one or more than one of the followings: the beam ID of one CSI-RS resource; beam-specific RSRP; beam-specific RSRQ; CQI measured CSI-RS conveyed in one CSI-RS resource; PMI and RI measured from CSI-RS conveyed in one CSI-RS resource; or CSI measured from CSI-RS conveyed in one CSI-RS resource.

In CSI-RS, beam-specific RSRP for beam ID b or CSI-RS resource is defined as the linear average over the power contributions (in [W]) of the resource elements and CSI-RS antenna ports that carry CSI-RS corresponding to beam ID b, within the considered measurement frequency bandwidth.

Figure 9:
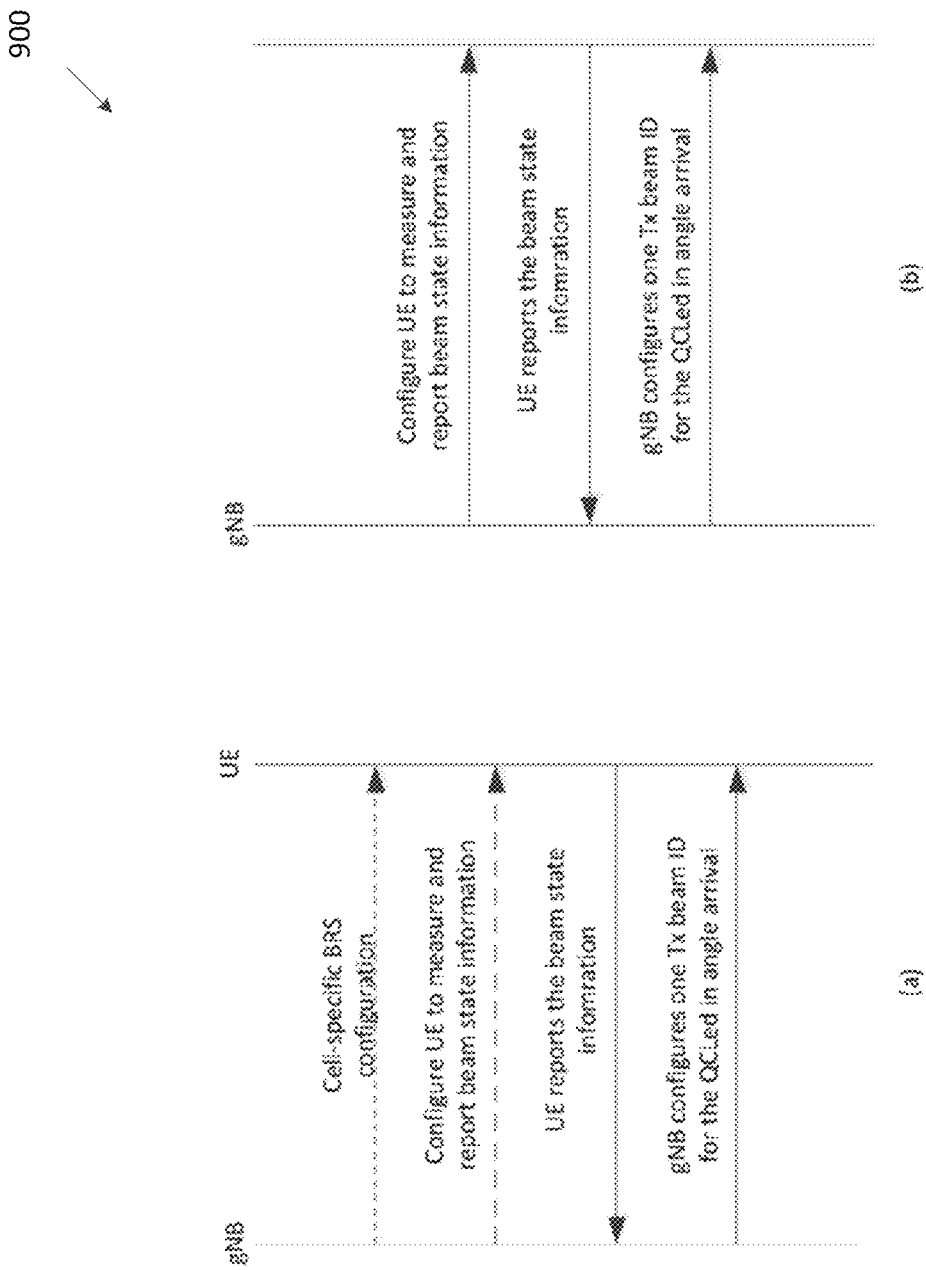
FIG. 9 illustrates an example call flow of beam management according to embodiments of the present disclosure.

FIG. 9 illustrates an example call flow of beam management 900 according to embodiments of the present disclosure. An embodiment of the call flow of beam management 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions. Other embodiments are used without departing from the scope of the present disclosure.

An example of beam management procedure of using cell-specific BRS is shown in FIG. 9. FIG. 9 illustrates the initial beam management procedure (e.g., (a)) and the normal management procedure after the initial procedure (e.g., (b)). As illustrated in FIG. 9, a gNB may optionally send the cell-specific BRS configuration to the UE. The gNB transmits cell-specific BRS (according to the BRS configuration if exists). The gNB may optionally send signaling to configure the UE to measure and report the beam state information for the initial beam management procedure. Then the UE reports beam state information, for example the pair of {beam ID, beam-specific RSRP} as configured. The gNB can send a Tx beam ID for being QCL'ed in angle of arrivals to the UE.

In the normal beam management procedure as illustrated in FIG. 9 (e.g., (b)), the gNB can use MAC-CE or L1 signaling (L1) to configure a UE to measure and report the beam state information based on measuring the reference signals conveyed on resources and BRS antenna port. Then the UE reports beam state information, for example the pair of {beam ID, beam-specific RSRP} as configured. The gNB can send a Tx beam ID for being QCL'ed in angle of arrivals to the UE.

The UE may also report beam state information, pair of {beam ID, beam-specific RSRP}, in RACH msg3.

Figure 10:
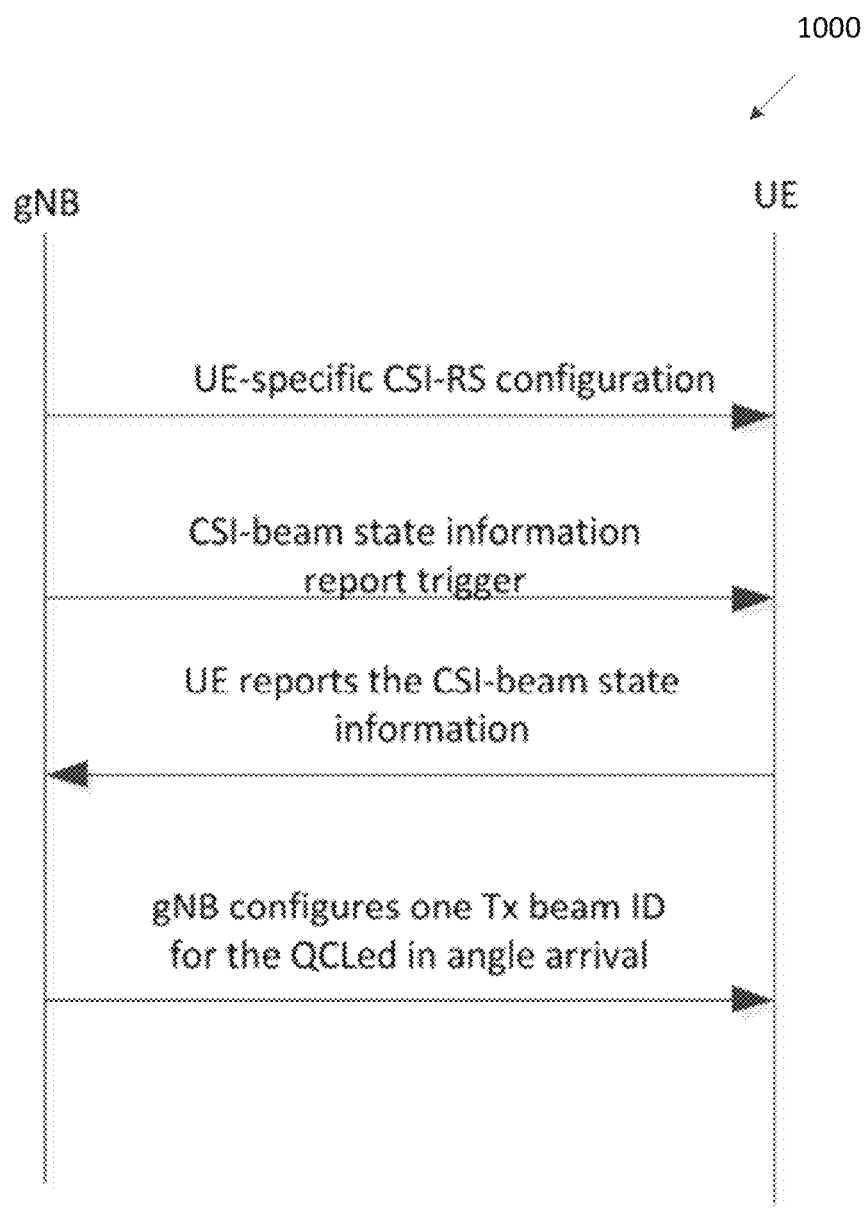
FIG. 10 illustrates another example call flow of beam management according to embodiments of the present disclosure.

FIG. 10 illustrates another example call flow of beam management 1000 according to embodiments of the present disclosure. An embodiment of the call flow of beam management 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. Other embodiments are used without departing from the scope of the present disclosure.

An example of beam management procedure of using UE-specific CSI-RS is shown in FIG. 10. As illustrated in FIG. 10, a gNB sends the UE-specific CSI-RS configuration to the UE, in which there are one or multiple CSI-RS processes and each CSI-RS process contains one or more CSI-RS and each CSI-RS resources contain one or more CSI-RS antenna ports. The gNB sends CSI-beam state information report trigger message through L1 signaling (i.e., DCI) to indicate the UE to measure and report CSI-beam state information based on the measurement on the configured CSI-RS processes. If the CSI-RS transmission is aperiodic, the CSI-beam state information report trigger message also configures the aperiodic CSI-RS transmission. If the CSI-RS transmission is periodic, the CSI-beam state information report trigger message can configure the UE to measure the CSI-beam state information based on the periodic CSI-RS transmission. The UE reports the CSI-beam state information, which can contains beam ID, beam-specific RSRP, CQI, PMI, RI and/or CSI that are measured from the CSI-RS signal transmitted on the antenna ports of each CSI-RS resource. The gNB can send a Tx beam ID that is QCL'ed in angle of arrivals to the UE.

Figure 11:
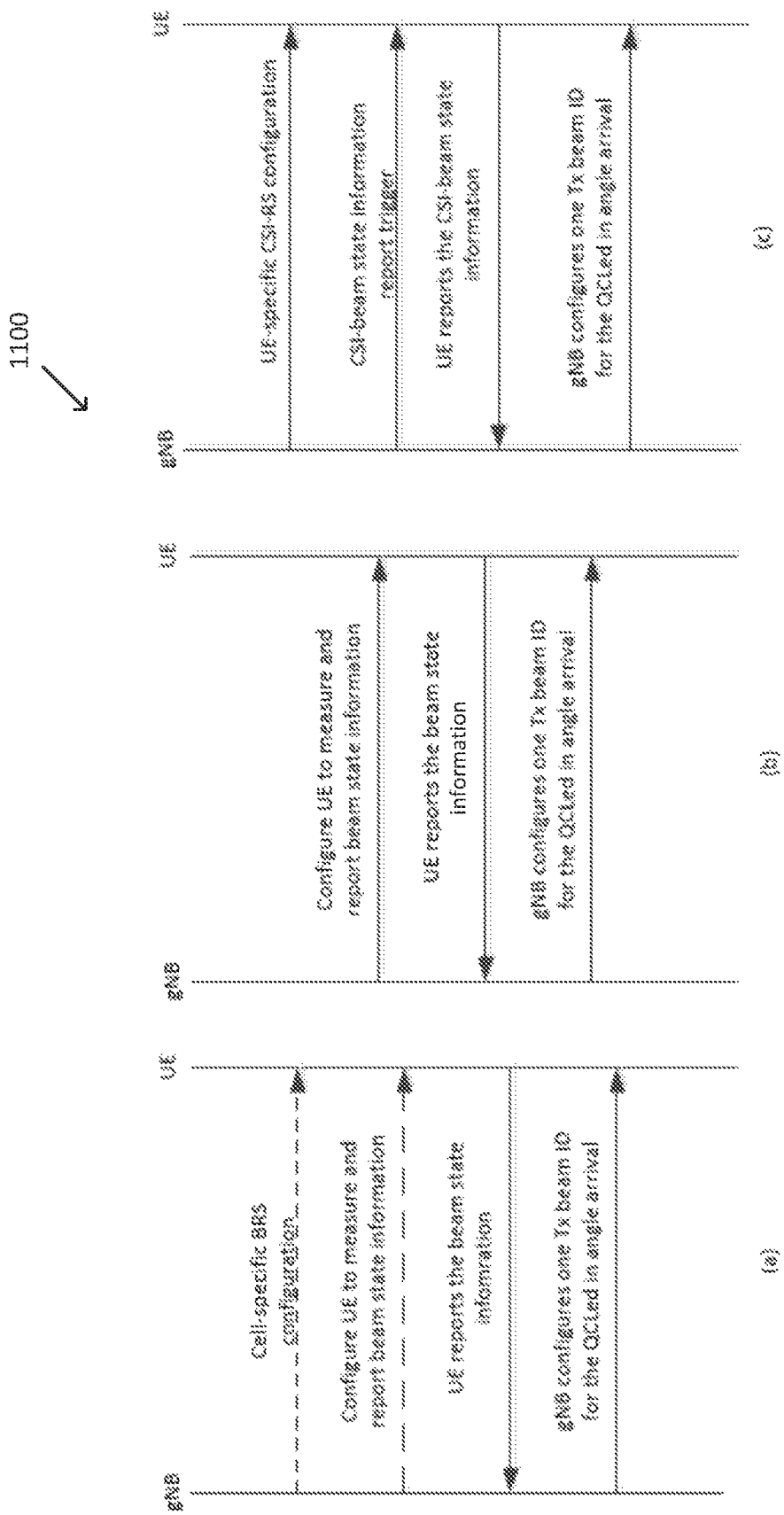
FIG. 11 illustrates yet another example call flow of beam management according to embodiments of the present disclosure.

FIG. 11 illustrates yet another example call flow of beam management 1100 according to embodiments of the present disclosure. An embodiment of the call flow of beam management 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions. Other embodiments are used without departing from the scope of the present disclosure.

An example of beam management procedure of using both cell-specific BRS and UE-specific CSI-RS is shown in FIG. 11. As illustrated in FIG. 11, there are three procedures in this case. FIG. 11 illustrates the initial beam alignment through BRS (e.g., (a)), the normal beam management procedure through BRS (e.g., (b)), and the normal beam management procedure through CSI-RS, which are after the initial beam alignment procedure (e.g., (c)).

As illustrated in FIG. 11, a gNB may optionally send the cell-specific BRS configuration to the UE. The gNB transmits cell-specific BRS (according to the BRS configuration if exists). The gNB may optionally send signaling to configure the UE to measure and report the beam state information for the initial beam management procedure. Then the UE reports beam state information, for example the pair of {beam ID, beam-specific RSRP} as configured. The gNB can send a Tx beam ID for being QCL'ed in angle of arrivals to the UE. The UE may also report beam state information, pair of {beam ID, beam-specific RSRP}, in RACH msg3.

As illustrated in FIG. 11, in the normal beam management procedure, the gNB can use MAC-CE or L1 signaling (L1) to configure a UE to measure and report the beam state information based on measuring the reference signals conveyed on resources and BRS antenna port. Then the UE reports beam state information, for example the pair of {beam ID, beam-specific RSRP} as configured. The gNB can send a Tx beam ID for being QCL'ed in angle of arrivals to the UE.

As illustrated in FIG. 11, in the beam management procedure of using UE-specific CSI-RS, gNB sends the UE-specific CSI-RS configuration to the UE, in which there are one or multiple CSI-RS processes and each CSI-RS process contains one or more CSI-RS and each CSI-RS resources contain one or more CSI-RS antenna ports. The gNB sends CSI-beam state information report trigger message through L1 signaling (i.e., DCI) to indicate the UE to measure and report CSI-beam state information based on the measurement on the configured CSI-RS processes. If the CSI-RS transmission is aperiodic, the CSI-beam state information report trigger message also configures the aperiodic CSI-RS transmission. If the CSI-RS transmission is periodic, the CSI-beam state information report trigger message can configure the UE to measure the CSI-beam state information based on the periodic CSI-RS transmission. The UE reports the CSI-beam state information, which can contains beam ID, beam-specific RSRP, CQI, PMI, RI and/or CSI that are measured from the CSI-RS signal transmitted on the antenna ports of each CSI-RS resource. The gNB can send a Tx beam ID that is QCL'ed in angle of arrivals to the UE.

In some embodiments, beam measurement reference signals (BRS or BMRS) are provided so that UE can measure beam strength/quality of individual beams. BMRS may alternatively be referred to as mobility RS (MRS) beam RS (BRS) or a channel state information RS (CSI-RS); and in this disclosure these terminologies are used interchangeably. In some embodiments, BRS refers to reference signals that can be used for L3 mobility. In some embodiments, BRS may correspond to a certain type of synchronization signals (SS). In the present disclosure, the beam strength/quality can refer to any of RSRP/RSRQ/CQI. In the present disclosure, a beam achieving the largest beam strength (in terms of RSRP or RSRQ or CQI) is denoted as the strongest beam among the set of configured beams in the subset.

As described above, BRS are mapped on the l consecutive OFDM symbols, and this BRS burst during the l consecutive OFDM symbols is referred to be a BRS sweep in this disclosure. The BRS sweep transmissions are repeated with a period $n_P$ subframes or time slots. A number of antenna ports (denoted as $N_p$) are configured for the BRS.

In one embodiment, l number of $N_p$-port BRS resources are either cell-specifically or UE-specifically configured. When configured with these l resources, the UE can measure $lN_p$ beam-strength values, one per port per resource. In another embodiment, the number of antenna ports $N_p$ is one of 1, 2, 4, or 8. UE is configured to measure beam quality/strength per antenna port per OFDM symbol in a BRS sweep. In other words, a time-domain measurement restriction is applied such that the UE derive one beam quality/strength value out of signal measurements on a BRS antenna port within each OFDM symbol; then the UE derives $lN_p$ values of beam quality/strength from each sweep, one value per antenna port per OFDM symbol. Beam (or radio resource) IDs are allocated per antenna port per OFDM symbol; and the total number of beam IDs in this case is $lN_p$.

In yet another embodiment, the number of antenna ports $N_p$ is $lN'_p$, where $N'_p$ is one of 1, 2, 4, or 8, and corresponds to the number of BRS antenna ports mapped on each OFDM symbol in a BRS sweep. In this case, $N_p$ corresponds to a product of the total number of OFDM symbols in a beam sweep (l) and the number of antenna ports per OFDM symbol ($N'_p$). Then the UE derives $lN_p$ values of beam quality/strength from each sweep, one value per antenna port. Beam (or radio resource) IDs are allocated per antenna port; and the total number of beam IDs in this case is $lN_p$.

In yet another embodiment, a total number of beam IDs determined independently of the number of antenna ports, and is the same as l. In such embodiment, a common beam ID is allocated to all the antenna ports in a same OFDM symbol, and a UE derives a beam strength value based on the total/average power received on the all the antenna ports in each OFDM symbol.

In some embodiments, the number of OFDM symbols to map BRS l, is explicitly indicated in xPBCH (or MIB) or ePBCH (or SIB) or via RRC signaling. TABLE 2 shows mapping techniques for the states of the BRS configuration field to the different values of l, when the field has either one or two bits. The example values for $N_{Syms}$ (total number of OFDM symbols of the subframe/slot/time interval to map the BRS) include 6, 7, 8, 12, 14, 16; and the example values for offset x include 1, 2, 3 and 4.

TABLE 2

Mapping for the state of the BRS configuration field

| State of the BRS configuration field | A first state (00 or 0) a first value | A second state (01 or 1) a second value | A third state (10) a third value | A fourth state (11) a fourth value |
|---|---|---|---|---|
| L Method 1 (2 bit field) | 1 | $N_{Syms} - 2x$ | $N_{Syms} - x$ | $N_{Syms}$ |
| Method 2 (2 bit field) | 1 | $N_{Syms} - 4x$ | $N_{Syms} - 2x$ | $N_{Syms} - x$ |
| Method 3 (1 bit field) | 1 | Alt 1: $N_{Syms}$<br>Alt 2: $N_{Syms} - x$ | | |

In one embodiment, a number of antenna ports NP is explicitly indicated in xPBCH (or MIB) or ePBCH (or SIB)

or via RRC signaling. TBLE 4 shows techniques to map the states of the antenna port configuration field to the different values of $N_P$, when the field has either one or two bits.

TABLE 4

Mapping for the state of the antenna port configuration

| State of the antenna port configuration field | | A first state (00 or 0) a first value | A second state (01 or 1) a second value | A third state (10) a third value | A fourth state (11) a fourth value |
|---|---|---|---|---|---|
| $N_P$ | Method 1 (2 bit field) | 1 | 2 | 4 | 8 |
|  | Method 3 (1 bit field) | 1 | Alt 1: 2 Alt 2: 4 Alt 3: 8 | | |

In some embodiments, the number of OFDM symbols to map BRS l, is explicitly indicated in xPBCH. In some embodiments, the BRS antenna ports are differently configured dependent upon whether the UE is configured in multi-beam based approach or single-beam based approach. When multi-beam is used, large number of IDs are necessary for supporting basic data coverage; on the other hand when single-beam is used, small number of IDs can be sufficient. The configuration to indicate a state out of these two states (single beam vs. multi beam) can be conveyed in xPBCH (or MIB) or ePBCH (or SIB) or via RRC signaling. In one example, when the UE is configured with a first state (multi-beam based operation mode), the beam IDs are allocated per BRS antenna port per OFDM symbol. In another example, when the UE is configured in a second state (single-beam based operation mode), the beam ID are allocated per OFDM symbol, i.e., a common beam ID is configured for the all the BRS antenna ports in each OFDM symbol.

In some embodiments, a gNB configures $N_g$ beam groups, so that UE can make a constrained measurement on the beams. The beam group configuration can be conveyed in xPBCH (or MIB) or ePBCH (or SIB) or via RRC signaling.

When a UE acquires coarse alignment during the initial access, the network is aware of the BRS OFDM symbol number for which the UE receives the best coarse beam. In this case, the network may configure the UE to measure beam-specific RSRPs/RSRQs/CQIs for those beams corresponding to the BRS OFDM symbol number, and some beams having similar correlation to those beams. When the number of beams UE needs to take measurement is reduced, UE can reduce power consumption for making the measurements.

In some embodiments, in terms of OFDM symbol numbers, the beam group configuration is indicated in terms of BRS OFDM symbol numbers. In one example, the BRS are mapped in OFDM symbol numbers 0, . . . , l−1. Then, the UE can be configured with a subset of {0, . . . , l−1}, so that the UE can make beam-strength measurement on beams transmitted on those OFDM symbols in the configured subset only. The beam group numbers can also be configured per configured OFDM symbol number in the subset. The measurement reporting contents include a list of a beam group number (or alternatively an OFDM symbol number), a beam ID (or alternatively an antenna port number) and a beam-strength value. The size of the list can be configured by the RRC, and denoted as $N_B$. A few methods to construct the list can be devised.

In one example, the list is constructed such that $N_B$ beams are chosen out of all the beams in the beam groups that achieve the largest $N_B$ beam-strength values. In another example, $N_B$ is equal to $N_g$ (=1) and the list is constructed such that one strongest beam (corresponding to an antenna port) is chosen from the $N_P$ antenna ports per every beam group (OFDM symbol). This constrained measurement can be made useful when gNB places high-correlation beams across antenna ports in each OFDM symbol.

In some embodiments, in terms of OFDM symbol numbers, the beam group configuration is indicated in terms of BRS antenna port numbers. In one example, the BRS antenna port numbers are 0, . . . , $N_P$−1. Then, the UE can be configured with a subset of {0, . . . , $N_P$−1}, so that the UE can make beam-strength measurement on beams transmitted on those antenna ports in the configured subset only. The beam group numbers can also be configured per configured antenna port in the subset. The measurement reporting contents include a list of a beam group number (or alternatively an antenna port number), a beam ID (or alternatively an OFDM symbol number) and a beam-strength value. The size of the list can be configured by the RRC, and denoted as $N_B$. A few methods to construct the list can be devised.

In one example, the list is constructed such that $N_B$ beams are chosen out of all the beams in the beam groups that achieve the largest $N_B$ beam-strength values. In another example, $N_B$ is equal to $N_g$ (=$N_P$) and the list is constructed such that one strongest beam (corresponding to an OFDM symbol) is chosen from the $N_P$ antenna ports per every beam group (an antenna port). This constrained measurement can be made useful when a gNB places high-correlation beams across OFDM symbols on each antenna port.

In some embodiments, a gNB configures $N_c$ beam clusters for a cell, so that UE can make cluster-specific RSRP/RSRQ/CQI measurement per cluster. The beam cluster configuration can be conveyed in xPBCH (or MIB) or ePBCH (or SIB) or via RRC signaling.

In one embodiment, the beam cluster configuration is in terms of BRS OFDM symbol numbers. For example, the BRS are mapped in OFDM symbol numbers 0, . . . , l−1; then, the UE is configured with a subset of {0, . . . , l−1} for each cluster. For a given cluster, UE derives a cluster-specific RSRP/RSRQ/CQI by taking an average of RSRP/RSRQ/CQI on the beam-specific RSRPs measured on all the BRS ports transmitted on the subset of BRS OFDM symbols.

In another embodiment, the beam cluster configuration is in terms of BRS antenna ports. For example, the BRS antenna port numbers are 0, . . . , $N_P$−1. Then, the UE can be configured with a subset of {0, . . . , $N_P$−1} for each cluster. For a given cluster, UE derives a cluster-specific RSRP/RSRQ/CQI by taking an average of RSRP/RSRQ/CQI on the beam-specific RSRPs measured on the BRS transmitted on the subset of BRS antenna ports across all the BRS OFDM symbols.

In yet another embodiment, the beam cluster configuration is in terms of BRS resources. For example, for a given cluster, UE is configured with $N_R$ BRS resources; then the UE derives a cluster-specific RSRP/RSRQ/CQI by taking an average of RSRP/RSRQ/CQI on the beam-specific RSRPs measured on all the BRS antenna ports across the configured BRS resources.

In some embodiments, the same definition can be used for cluster-specific RSRP/RSRQ as the one for cell-specific RSRP/RSRQ, except that the average is taken within the cluster-specific beams instead of cell-specific beams. For cluster-specific RSRP/RSRQ, L1/L2 filtering may be applied across the BRS transmitted in multiple time instances for the same beam ID for each cluster.

For initial cell selection in NR, a UE measures cell-specific RSRP/RSRQ from multiple cells, and selects the strongest cell on a given carrier frequency. In multi-beam based approach, beam-specific RSRPs/RSRQs can be estimated per individual beam (associated with a beam ID); and a cell-specific RSRP needs to be separately defined.

Beam-specific reference signal received power (RSRP) for beam b, is defined as the linear average over the power contributions (in [W]) of the resource elements that carry beam-specific reference signals (BRS) corresponding to beam b, within the considered measurement frequency bandwidth.

Cell/cluster-specific RSRP is derived as a function of beam-specific RSRPs derived with BRS that are transmitted for a cell.

A cell/cluster transmits BRS for B beams; but a UE can be configured to measure $B_1$ beam-specific RSRPs/RSRQs, wherein $B_1$ is less than or equal to B. The $B_1$ RSRP/RSRQ are denoted as $\{P_b: b=0, \ldots, B_1-1\}$. A beam subset corresponding to the $B_1$ beams can be configured as in the following.

In one example, for initial cell selection and for cell reselection for idle UEs, $B_1=B$, the UE is configured to measure all the B beam-specific RSRPs/RSRQs to derive the cell-specific RSRP/RSRQ.

In another example, for handover for an RRC connected UE, the UE can be configured to measure a subset of beams sent by a neighbor cell; in this case, $B_1$ corresponds to the number of beams in the subset for the neighbor cell, and the subset can be cell-specific. The UE can be indicated with a subset of beams per neighbor cell UE needs to make a measurement, either in terms of BIs, or in terms of OFDM symbol numbers on which the UE needs to measure RSRPs/RSRQs.

In yet another example, the UE is always configured with $B_1=B$, regardless of idle or RRC connected; and the UE is configured to measure all the B beam-specific RSRPs/RSRQs to derive the cell-specific RSRP/RSRQ.

In yet another example (Alt. 1), linear average of $B_1$ beam-specific RSRPs/RSRQs, linear average models the resulting link quality in terms of average data SINR. The average SINR on the $B_1$ REs whose beam-specific RSRPs/RSRQs are represented by $\{P_b: b=0, \ldots, B_1-1\}$ can approximately modeled as $$\frac{1}{B_1}\sum_{b=0}^{B_1} P_b.$$

In yet another example (Alt. 2), geometric mean of $B_1$ beam-specific RSRPs/RSRQs, Geometric mean models the resulting link quality in terms of data rate. The data rate achieved by $B_1$ REs whose beam-specific RSRPs/RSRQs are represented by $\{P_b: b=0, \ldots, B_1-1\}$ can approximately modeled as $$\sum_{b=0}^{B_1-1} \log_2(P_b) = \log_2\left(\prod_{b=0}^{B_1-1} P_b\right);$$

this value can be represented by the geometric mean of $$\left(\prod_{b=0}^{B_1-1} P_b\right)^{1/B_1}.$$

In yet another example (Alt. 3), geometric mean of sum of the beam-specific RSRP/RSRQs calculated from the BRS ports transmitted on every OFDM symbol, the data rate achieved by l OFDM symbols, each of which has $(B_1/l)$ REs can approximately modeled as $$\frac{1}{\ell}\sum_{l=0}^{\ell-1} \log_2\left(\frac{1}{N_P}\sum_{p=0}^{N_P-1} P_{p,l}\right) = \frac{1}{\ell}\log_2\left(\prod_{l=0}^{\ell-1}\left(\frac{1}{N_P}\sum_{p=0}^{N_P-1} P_{p,l}\right)\right);$$

this value can be represented by the proposed value of $$\left(\prod_{l=0}^{\ell-1}\left(\frac{1}{N_P}\sum_{p=0}^{N_P-1} P_{p,l}\right)\right)^{1/\ell}.$$

Here, $\{P_{p,l}: p=0, \ldots, N_P-1;$ and $l=0, \ldots, l-1\}$ are the beam-specific RSRPs/RSRQs of antenna port p on OFDM symbol l; and $N_P l=B_1$.

In yet another example (Alt. 4), linear average of $B_0$ largest beam-specific RSRPs/RSRQs, wherein $B_0$ strongest beams of a cell are selected for the linear average, wherein $B_0$ is a positive integer, such as 1, 2, 3, 4, . . . In one instance, the value $B_0$ is cell-common, and is a constant specified in standards specification. In another instance, $B_0$ is cell-specific, and is configured in the RRC for each cell. In a special case, $B_0=1$, and hence only the strongest beam is taken into account for the cell-specific RSRP calculation.

The expected mobility behaviors for IDLE and RRC-connected UEs are different. IDLE UEs camp on a cell, and are requested to read some system information, and perform RACH process and report some information to the camp-on cell. On the other hand, RRC-connected UEs is configured to transmit/receive user specific data to the network. For IDLE UEs, maintaining the basic connectivity is important; and for RRC-connected UEs, data transmission quality, which is determined by the quality of the best beam, is important. Hence, it could be beneficial to differently define the cell-specific RSRP/RSRQ for RRC-connected and IDLE UEs.

In some embodiments, if a UE is in IDLE mode, the UE derives cell-specific RSRP as an average of beam-specific RSRPs/RSRQs all the beams (e.g., according to the aforementioned Alt, 1, Alt. 2, and Alt. 3); else if UE is in RRC-connected mode, the UE derives cell-specific RSRP/RSRQ considering $B_0$ largest beam specific RSRP/RSRQs (according to the aforementioned Alt. 4).

When a UE is IDLE, the UE is not expected to transmit/receive heavy data to/from the network. Hence, cell association may be sufficient and beam association is not necessary. In this case, knowledge on the individual beam strengths (RSRP/RSRQ) is not necessary for mobility. The reference signals to derive RSRPs/RSRQs only need to facilitate cell-specific RSRP measurement. The BW to measure the RSRPs/RSRQs is left to the UE implementation in LTE, and the UE may be allowed to have the same implementation flexibility. Hence, it may also be desired for UE to be able to measure wideband RSRP, when the UE desires so.

The RS for UE's measuring the cell-specific RSRP do not need to be transmitted per individual beam; and even SS can be used for this purpose. In one method, SS is used for UE's cell-specific RSRP derivation in IDLE mode. In a special case of multi-beam based initial access, the network utilizes multiple beams transmitted in multiple OFDM symbols to cover the coverage area of a cell. In such a case, SS needs to be transmitted across multiple OFDM symbols. The UE is expected to derive the beam specific RSRPs/RSRQs, one per OFDM symbol with SS, and take an average of the RSRP/RSRQ values to derive the cell specific RSRPs/RSRQs. The UE may be further configured to derive an OFDM symbol number of the strongest SS (with strongest RSRP/RSRQ among the other SS of the same cell transmitted in different OFDM symbols), for the UE's RACH resource selection. One drawback of this method is that the RSRP measurement is restricted within the SS bandwidth, and it is not possible IDLE UEs can make measurement outside the SS bandwidth.

In some embodiments, to allow IDLE UEs to make a measurement outside the SS bandwidth, the UE measures beam-specific RSRPs/RSRQs utilizing BRS (which is mapped across the full system bandwidth) to derive cell-specific RSRPs/RSRQs as in some embodiments of the present disclosure.

It is noted that the cell-specific RSRPs/RSRQs derived with taking an average of the beam-specific RSRPs/RSRQs are different from that derived with taking an average of RSRPs/RSRQs of SS transmitted on different OFDM symbols. This is because SS has composite beam patterns, and BRS used to deriving the beam-specific RSRPs/RSRQs have individual beam patterns. As sum of magnitude squares of i.i.d. random variables is greater than magnitude square of sum of i.i.d. random variables more frequently than the other way around (i.e., diversity gain), if the PBCH transmission is based on diversity scheme, the RSRPs/RSRQs derived with the BRS can be a better estimate of the PBCH decoding reliability than those derived with the SS.

In some embodiments, the IDLE UEs measure RSRPs/RSRQs with taking an average across SS beams and BRS beams. In this case, the RSRPs/RSRQs derived SS is given with $N_P$ times weight as that of the BRS in taking the average, wherein $N_P$ is the number of BRS antenna ports mapped on an OFDM symbol. This is because SS signals are generated with virtualizing $N_P$ antenna ports.

When a UE is in RRC-connected mode, UE is expected to transmit/receive data to/from the network. Hence, beam association is necessary, as well as cell association. For both inter-cell and intra-cell mobility (a.k.a. beam management), BRS can be used. The differences of inter-cell and intra-cell mobility measurements could include the quantity to be measured out of the BRS. For inter-cell mobility, cell-specific RSRP (as a function of the beam specific RSRPs/RSRQs) is measured according to some embodiments of the present disclosure. For intra-cell mobility, beam-specific RSRP/RSRQ/CQI is measured according to some embodiments of the present disclosure.

Figure 12A:
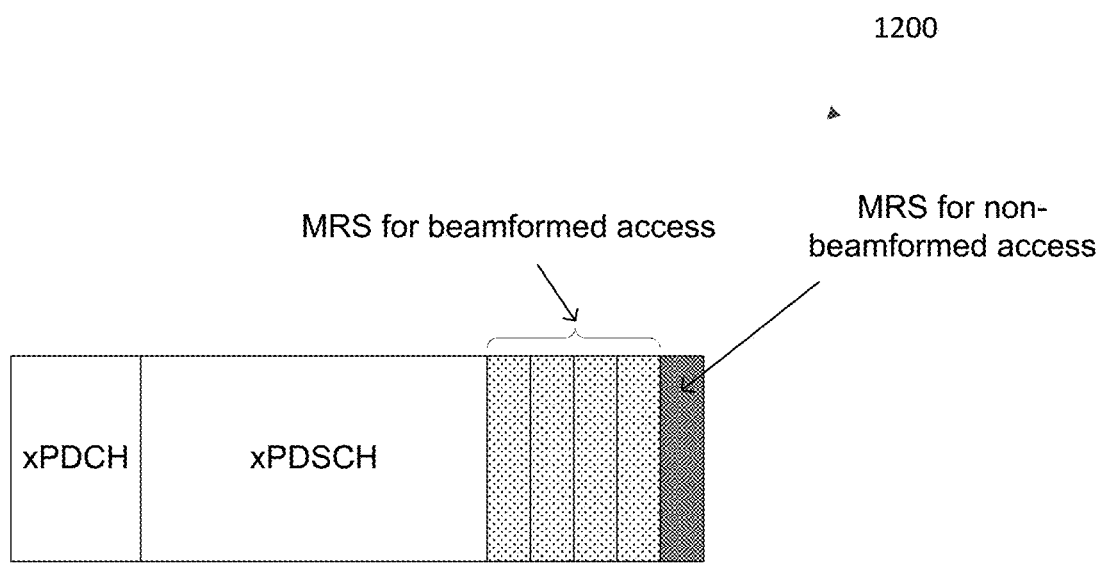
FIG. 12A illustrates an example MRS transmission according to embodiments of the present disclosure.

FIG. 12A illustrates an example MRS transmission 1200 according to embodiments of the present disclosure. An embodiment of the MRS transmission 1200 shown in FIG. 12A is for illustration only. One or more of the components illustrated in FIG. 12A can be implemented in specialized circuitry configured to perform the noted functions or one or more of the components can be implemented by one or more processors executing instructions to perform the noted functions. Other embodiments are used without departing from the scope of the present disclosure. FIG. 12A illustrates BRS transmissions according to some embodiments of the present disclosure.

In some embodiments, separate (orthogonal) measurement RS resources are provided for the beamformed operation mode and for the non-beamformed operation mode. In one example, the BRS for non-beamformed operation mode is transmitted on the last OFDM symbol of one subframe; and the MRS for beamformed operation mode are transmitted on multiple (l) OFDM symbols (e.g., OFDM symbols $N_{Sym}$-1-l, ..., $N_{Sym}$-2) in the same subframe other than the last OFDM symbol and can be transmitted with multiple ($lN_P$) beams.

Figure 12B:
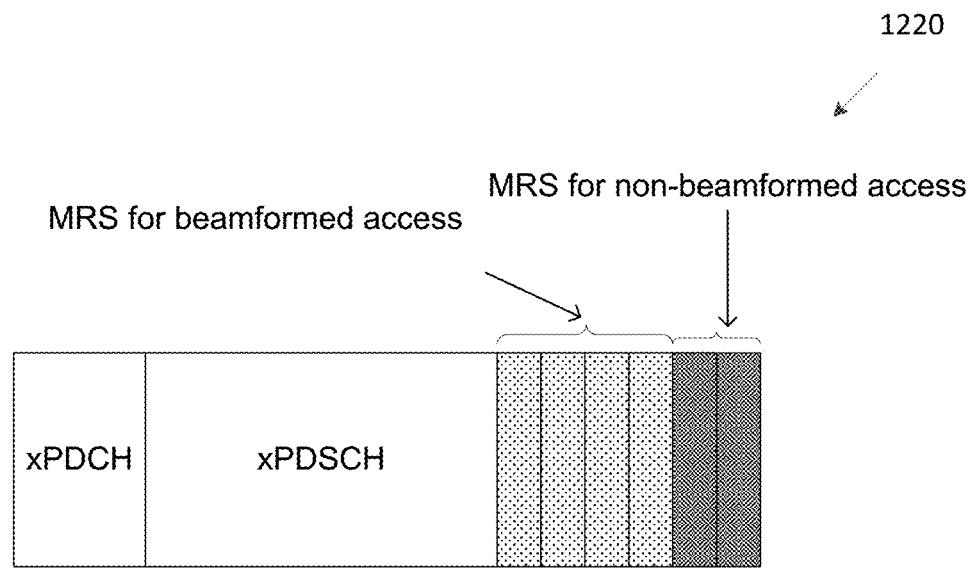
FIG. 12B illustrates another example MRS transmission according to embodiments of the present disclosure.

FIG. 12B illustrates another example MRS transmission 1220 according to embodiments of the present disclosure. An embodiment of the MRS transmission 1220 shown in FIG. 12B is for illustration only. One or more of the components illustrated in FIG. 12B can be implemented in specialized circuitry configured to perform the noted functions or one or more of the components can be implemented by one or more processors executing instructions to perform the noted functions. Other embodiments are used without departing from the scope of the present disclosure.

In another example, the MRS for non-beamformed operation mode is transmitted on the last $l_1$ OFDM symbols of one subframe; and the MRS for beamformed operation mode are transmitted on $l_2$ OFDM symbols (e.g., OFDM symbols $N_{Sym}$-$l_1$-$l_2$, ..., $N_{Sym}$-1-$l_1$) in the same subframe other than the last l OFDM symbols and can be transmitted with $l_2 N_P$ beams as shown in FIG. 12A.

In one embodiment, different measurement restriction conditions are applied for MRS for non-beamformed access, and MRS for beamformed access. For MRS for non-beamformed access the UE is allowed to make a measurement of an MRS antenna port across OFDM symbols in a measurement period; and for MRS for beamformed access, the UE may make a measurement per MRS antenna port per OFDM symbol in a measurement period.

Some embodiments of the present disclosure are described assuming cellular DL communications. However, the same/similar principles and related signaling methods & configurations can also be used for cellular UL & sidelink (SL) communications.

In some embodiments, the two terminologies, "RS for mobility" and "beam reference signals (BRS)" are used interchangeably. In some embodiments of this disclosure, CSI refers to at least one of CQI, PMI, RI, RSRP, and a CSI-related resource index (e.g., beam index, CSI-RS resource index). In some embodiments, BSI refers to at least one of: (1) beam index that can be derived from CSI-RS port index, beam resource index/time unit index and B-CSI-RS resource index; and (2) RSRP and/or RSRQ of the reported beam.

In some embodiments, it is assumed that UE is configured with reference numerology (comprising OFDM symbol length and subcarrier spacing) at least for PDSCH reception. In some embodiments, the two terminologies, "beam resource" and "time unit" are used interchangeably.

One or more CSI-RSs are configured to one UE for beam management. Those CSI-RS resources are used by the UE for measurement of the beam state information (BSI). Configuration of CSI-RS for beam management contains the following aspects: the number of time units in a burst; the number of CSI-RS antenna ports, $N_p$; the number of repetitions (sub-time units) within one time unit, X; the numerology scaling factor, a; the starting OFDM index l for mapping CSI-RS resource; the starting subcarrier index k where to map CSI-RS in frequency domain; the indices of $N_p$ antenna ports of CSI-RS; information on time-resources to map the Y time units; and information on CSI-RS transmission opportunities (in terms of slot/subframe indices).

Figure 13A:
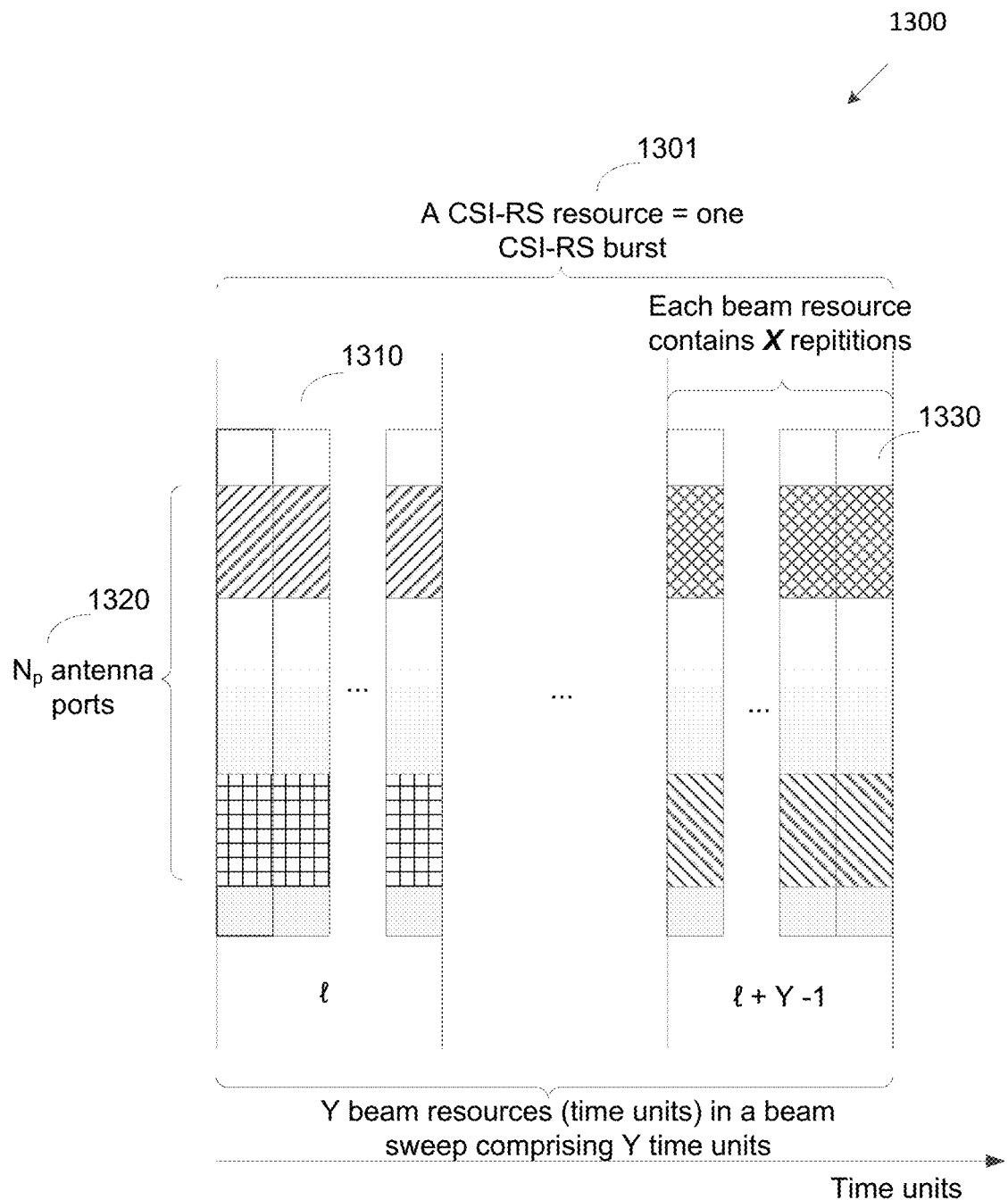
FIG. 13A illustrates an example CSI-RS configuration according to embodiments of the present disclosure.

FIG. 13A illustrates an example CSI-RS configuration 1300 according to embodiments of the present disclosure. An embodiment of the CSI-RS configuration 1300 shown in FIG. 13A is for illustration only. One or more of the components illustrated in FIG. 13A can be implemented in specialized circuitry configured to perform the noted functions or one or more of the components can be implemented by one or more processors executing instructions to perform the noted functions. Other embodiments are used without departing from the scope of the present disclosure.

An example of CSI-RS configuration is shown in FIG. 13A. As illustrated in FIG. 13A, one CSI-RS resource 1301 contains Y time units. The time units are mapped to OFDM symbols $\{l, l+1, \ldots, l+Y-1\}$, as shown in FIG. 13A. In the CSI-RS resource 1301, there are Y beam resources comprising Y time units where the gNB and/or TRP would apply beam sweeping; one beam resource is mapped on one time unit. Within each time unit 1310, there are $N_p$ CSI-RS antenna ports 1320. In each time unit 1310, the $N_p$ antenna ports 1320 are repeated X times. The UE is configured to operate Rx beam sweeping over the X repetitions 1330 within each time unit 1310.

In the present disclosure, a QCL resource may refer to a beam, an antenna port (across all the configured time units), a group of antenna ports corresponding to an RS resource, a CSI-RS resource, or a combination of an antenna port and a time unit of an RS resource.

In the present disclosure, an RS resource may refer to a CSI-RS resource, BRS (multi-beam mobility RS, can be cell-specifically configured, may correspond to PSS, SSS, PBCH DMRS, DMRS, CSI-RS or a newly designed RS), a set of DMRS ports, etc.

In the present disclosure, an RS setting may refer to a set of RS resources. In the present disclosure, a time unit may correspond to a block of (consecutive) one or more OFDM symbols according to a configured numerology, on which UE can assume that a same QCL parameter is applicable to each antenna port (and/or in which the port-coherency holds).

In the present disclosure, a Tx beam (ID) may refer to a QCL resource of an RS resource, wherein the RS resource can be BRS or CSI-RS. Tx beams of an RS resource or an RS setting can be indexed with unique IDs, referred to Tx beam IDs. For example, if N Tx beams are available in an RS resource or an RS setting, N unique IDs can be allocated to these N individual Tx beams.

In the present disclosure, an Rx beam ID refers to an index that can be commonly understood by UE and gNB, for UE's Rx beamforming operation. A UE can be equipped with a single or multiple digital Rx chains. When the UE is equipped with a single Rx chain, a first Rx beam ID corresponds to a first Rx beam that is steered to a first angle; a second Rx beam ID corresponds to a second Rx beam that is steered to a second angle; and so on. When the UE is equipped with N digital Rx chains, the first Rx beam ID corresponds to a first set of N Rx beams that are steered to a first set of N angles; the second Rx beam ID corresponds to a second set of N Rx beams that are steered to a second set of N angles; and so on. Here, N is a positive integer. As an Rx beam ID may be associated with multiple Rx beams (especially in multiple digital chain case), an Rx beam ID may alternatively referred to an Rx mode.

In the present disclosure, Rx-beam, Rx mode and Rx-beam related QCL parameters are used interchangeably, and refer to average AOA, ASD or antenna correlations. When an Rx beam of a first QCL resource can be inferred by that of a second QCL resource, the first and the second QCL resources are said QCL'ed in Rx-beam/Rx mode.

In the present disclosure, a set of QCL parameters refers to a combination of Rx-beam related parameters (average angle of arrival, arrival angle spread, Rx antenna correlation, etc.), delay and timing related parameters (Rx timing, delay spread, average delay), Doppler related parameters (average Doppler, Doppler spread), etc.

In order to allow for a UE and gNB to have a common understanding on Rx beam IDs, the UE needs to feedback information on Rx beam IDs. For this purpose, the UE can be indicated, e.g., by RRC or DCI or MAC-CE signaling to derive Rx mode(s) according to one of the following options: an Rx mode of each configured QCL resource, one Rx mode per QCL resource; an Rx mode applicable to all the QCL resources corresponding to an RS setting or to an RS resource; or an Rx mode applicable to each group of QCL resources corresponding to an RS setting or to an RS resource, on Rx mode per group, wherein the setting/resource is partitioned into multiple QCL resources.

In one example, a QCL resource is a time unit, and an RS resource is a CSI-RS resource comprising X time units. In this example, the UE can be configured to derive X Rx modes for the X time units, one Rx mode per time unit. The UE can be further configured to feedback a BSI report comprising the X Rx modes and corresponding B-RSRP.

In another example, a QCL resource is a Tx beam which refers to a combination of a time unit and an antenna port, and an RS resource is a BRS resource comprising X time units and $N_P$ antenna ports. In this example, the UE can be configured to derive $X \cdot N_P$ Rx modes for the $X \cdot N_P$ Tx beams, one Rx mode per Tx beam. The UE can be further configured to feedback a BSI report comprising a combination of T Tx beams, T corresponding Rx modes and T corresponding B-RSRP. Here, Rx mode reporting may be omitted.

A UE may be configured to measure TRP Tx beam strengths, with applying G different Rx modes. The UE can be configured to report G groups of Tx beam IDs: a first group of M TRP Tx beam IDs that are QCL'ed to a first Rx beam (ID); a second group of M TRP Tx beam IDs that are QCL'ed to a second Rx beam (ID); and so on. Here, M and G are a positive integer. The G groups can be indexed by $0, \ldots, G-1$ (or $1, \ldots, G$), and correspond to G different Rx modes.

A gNB can indicate UE to use an Rx mode for DL signal reception (PDSCH and PDSCH DMRS) via RRC, MAC-CE or DCI signaling. In one example, a gNB indicates an Rx mode using the group index $g \in \{0, \ldots, G-1\}$. When the indicated Rx mode is g, a UE is configured to tune the transceiver to use Rx mode g (for PDSCH and PDSCH DMRS port reception).

A UE can be configured with a QCL reference resource for a set of QCL parameters, when the UE is configured with a set of QCL resources that are QCL in the set of QCL parameters. For example, UE is configured with first and second QCL resources that are QCL in a set of parameters, and the first QCL resource is a QCL reference resource. Then, the UE derives the set of parameters based on the first QCL resource, and derives CSI (including beam-RSRP) or estimates channels on the second antenna port with assuming that the same set of parameters as the first QCL resource are applied to the second QCL resource.

For each group of QCL resources in a CSI-RS setting, a UE can be indicated with a QCL reference resource for Rx beam related parameters that may be assumed across all the QCL resources within a group.

In one example, for each sub-time unit of CSI-RS resources in a CSI-RS setting, a UE is indicated with a QCL reference resource for Rx beam related parameters that may be assumed across CSI-RS ports, across time units and across CSI-RS resources in the CSI-RS setting. The QCL reference resource can be either a QCL resource of a CSI-RS resource in the CSI-RS setting; or a TRP Tx beam (e.g., a combination of an antenna port and a time unit of BRS).

In some embodiments, an RRC message, a MAC CE or a DCI signaling may indicate a combination of the following information for an RS resource: a first information (e.g., a QCL reference resource); or a second information (e.g., a group of QCL resources for which a UE may use the same set of QCL parameters for demodulation or for beam/CSI measurements as those measured by the QCL reference resource).

When only the first information is indicated by the signaling, the UE can be configured to use the set of QCL parameters measured by the QCL reference resource for all the QCL resources in the group of QCL resources. When only the second information is indicated by the signaling, the UE can be configured to assume that a first QCL resource may be the QCL reference resource for the indicated QCL resources in the second information. A UE can be indicated with a list of G pairs of information: (the first information, the second information), in case the RS setting has G groups of QCL resources, each of which has own QCL reference resource. A UE can be indicated with separate lists of QCL reference resources for different set of QCL parameters. A UE can be indicated with separate lists of QCL reference resources for different RS resources belonging to the RS setting. QCL reference resource related information may be differently configured for different RS types. QCL reference resource related information may be differently configured for different RS settings.

A UE may assume that a QCL reference resource for each CSI-RS resource is all the antenna ports on a first time (or sub-time) unit of the CSI-RS resource. A first QCL reference resource for an RS setting comprising multiple CSI-RS resources can be all the antenna ports on a first time unit of a first CSI-RS resource; a second QCL reference resource for the RS setting is all the antenna ports on a first time unit of a second CSI-RS resource. The identity of the first and the second CSI-RS resources can be indicated by RRC, MAC CE or DCI signaling.

For each CSI-RS resource for beam management, a UE can be configured to measure a first Rx beam using the QCL reference resource, and further configured to use the first Rx beam for deriving CSI/beam reports for the configured CSI-RS resource or for the configured CSI-RS setting; For example, the indicated information can be such that a UE may assume that a group of QCL resources in the configured CSI-RS resource are QCL'ed with those measured from the reference QCL resource in Rx beam related parameters. Then, the UE is configured to apply the Rx beam measured from the reference QCL resource to derive beam/CSI measurements for beam/CSI reporting on a group of the QCL resources within the CSI-RS resource.

For an RS setting comprising a number of CSI-RS resources, a UE can be configured to measure Rx beam related parameters across all the antenna ports on a first time unit on a first CSI-RS resource, and further configured to use the measured Rx beam related parameters for deriving CSI/beam reports across all the time units across all the CSI-RS resources in the RS setting.

A DL assignment DCI may indicate reference QCL resource(s) to be used for demodulation of a PDSCH assigned by the DCI. Alternatively, a MAC CE or a DCI may indicate reference QCL resource(s) to be used for demodulation of PDSCHs to be scheduled in the (current and) future time slots. A UE may assume that the PDSCH DMRS ports are QCL'ed with the indicated QCL resource(s). For these indications, a single QCL resource (e.g., a QCL resource on a CSI-RS resource, BRS TRP Tx beam ID) may be indicated for all the QCL parameters. Alternatively, one QCL resource may be indicated for each set of QCL parameters; for example, a first QCL resource is indicated for Rx beam related parameters; a second QCL resource is indicated for Doppler related parameters; and a third QCL resource is indicated for delay related parameters.

A UE is configured with a CSI-RS resource comprising Np antenna ports and Y time units, and the UE is indicated that a QCL reference resource in Rx beam that may be assumed across time units for each antenna port is a first time unit for the antenna port. Then, the UE is configured to derive a set of QCL parameters for an antenna port based on the measurement on the first time unit, and use the set of QCL parameters to derive beam/CSI measurements for the rest of time units for the antenna port.

A UE is configured with a CSI-RS resource comprising Np antenna ports and Y time units, and the UE is indicated that a QCL reference resource in Rx beam that may be assumed across time units across all the antenna ports is a first time unit across all the antenna ports. Then, the UE is configured to derive a set of QCL parameters based on the measurement on the first time unit, and use the set of QCL parameters to derive beam/CSI measurements for the rest of the time units.

Figure 13B:
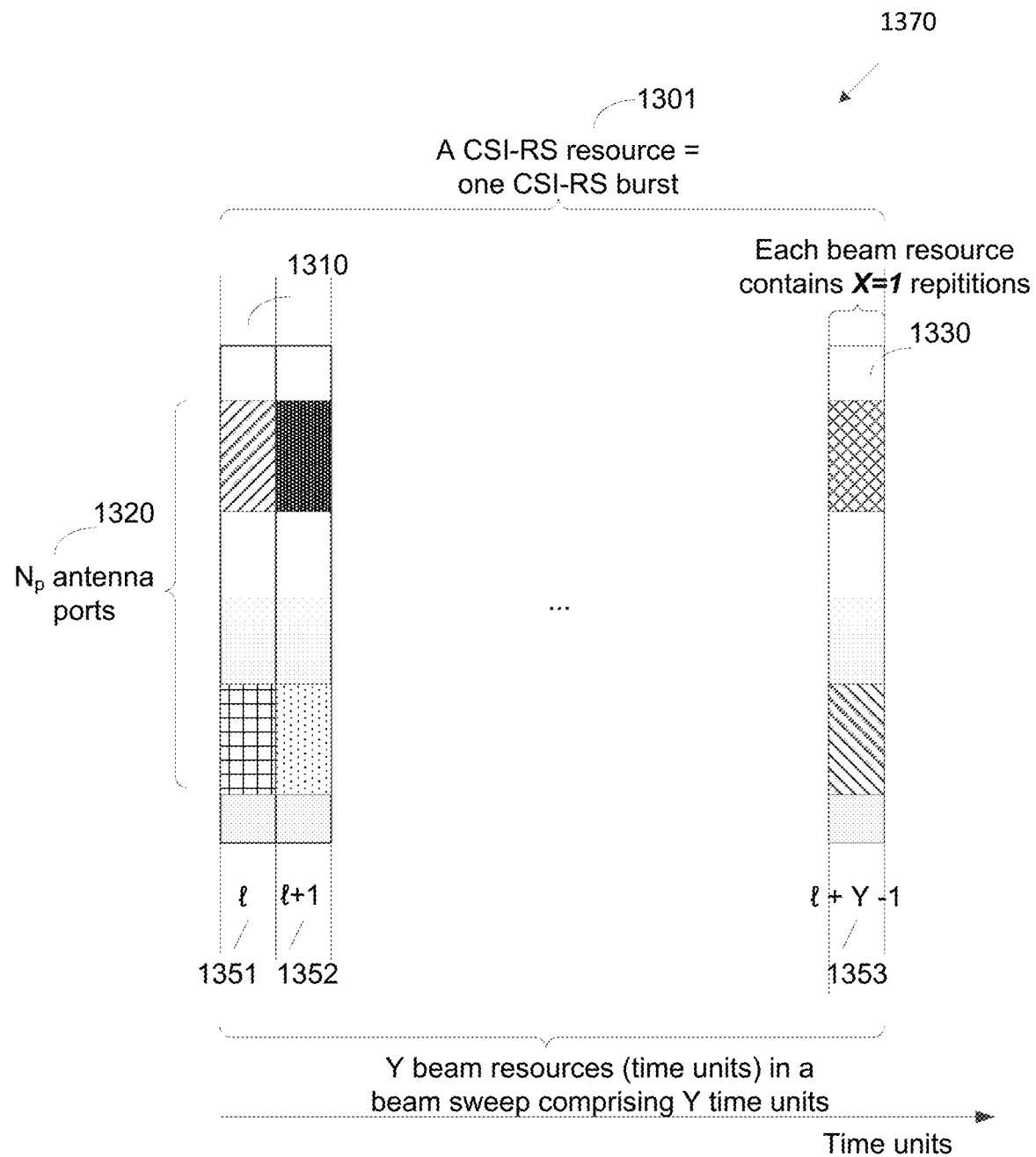
FIG. 13B illustrates another example CSI-RS configuration according to embodiments of the present disclosure.

FIG. 13B illustrates another example CSI-RS configuration 1370 according to embodiments of the present disclosure. An embodiment of the CSI-RS configuration 1370 shown in FIG. 13B is for illustration only. One or more of the components illustrated in FIG. 13B can be implemented in specialized circuitry configured to perform the noted functions or one or more of the components can be implemented by one or more processors executing instructions to perform the noted functions. Other embodiments are used without departing from the scope of the present disclosure.

An example is shown in FIG. 13B. As illustrated in FIG. 13B, the CSI-RS resource is configured with X=1, i.e., one repetition within each time unit. The Y time units in this CSI-RS are QCL'ed to Rx beams. In this example, the UE is configured to apply the same Rx beam on all the time units, 1351, 1352, and 1353 within the CSI-RS resources. The Rx beam that the UE may apply can be signaled by the gNB implicitly or explicitly.

In some embodiments, the Rx beam that the UE may apply is the Rx beam that is QCL'ed to the Tx beam conveyed by a particular CSI-RS antenna port that can be predefined, e.g., a first antenna port, a first N antenna port, a first time unit.

Figure 13C:
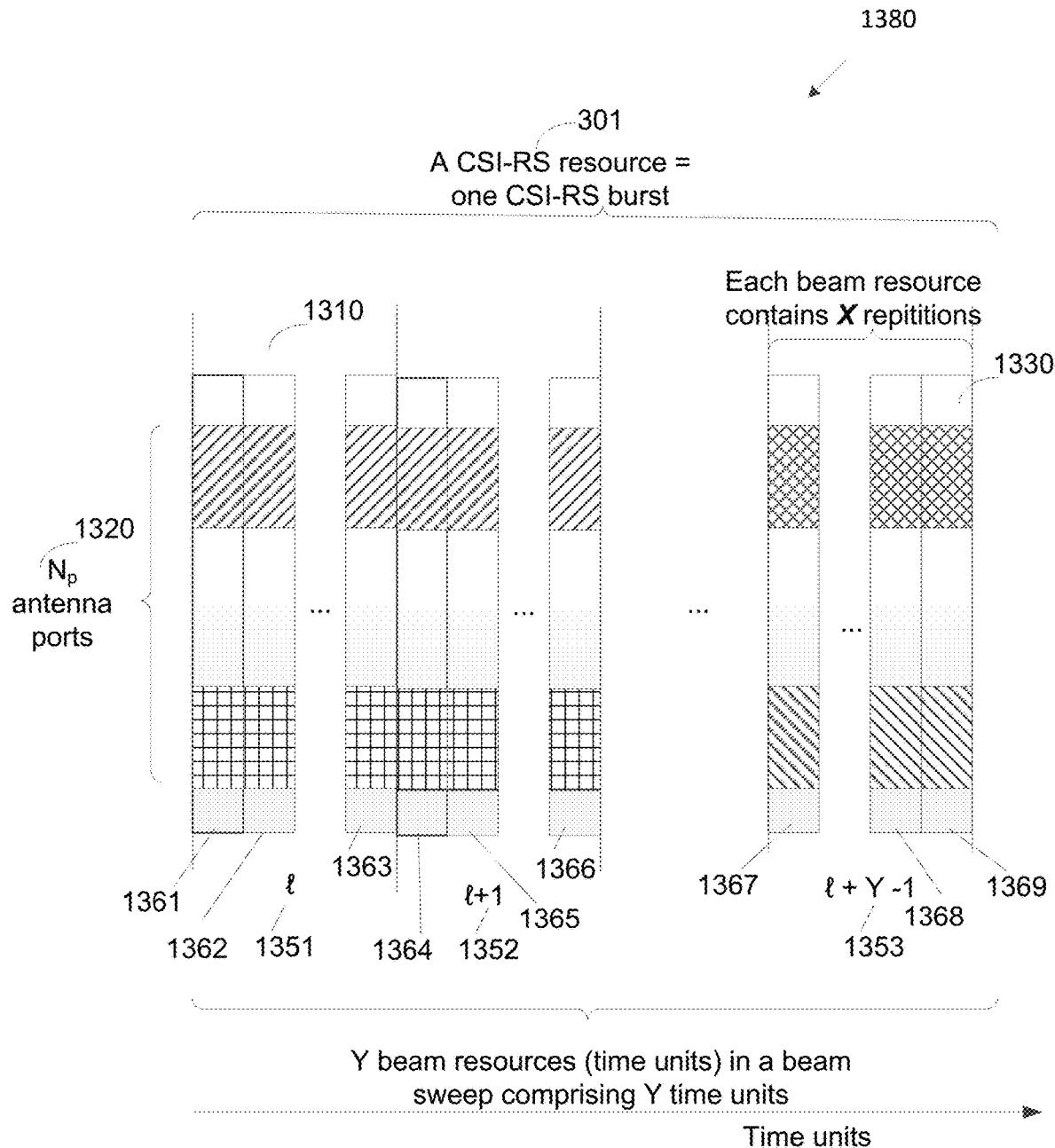
FIG. 13C illustrates yet another example CSI-RS configuration according to embodiments of the present disclosure.

FIG. 13C illustrates yet another example CSI-RS configuration 1380 according to embodiments of the present disclosure. An embodiment of the CSI-RS configuration 1380 shown in FIG. 13C is for illustration only. One or more of the components illustrated in FIG. 13C can be implemented in specialized circuitry configured to perform the noted functions or one or more of the components can be implemented by one or more processors executing instructions to perform the noted functions. Other embodiments are used without departing from the scope of the present disclosure.

An example is shown in FIG. 13C. As illustrated in FIG. 13C, the CSI-RS resource is configured with X>1, i.e., more than one repetition within each time unit. The Y time units in that CSI-RS resource are QCL'ed to Rx beams. In this example, the UE is configured to apply the same subsets of Rx beams on all the time units, 1351, 1352, and 1353 within the CSI-RS resources. The UE is configured to apply the same beam(s) on first repetitions 1361, 1364, 1367 of all time units. The UE is configured to apply the same beam(s) on second repetitions 1362, 1365, 1368 of all the time units. The beam(s) applied to different repetitions in one time unit can be different.

The gNB can indicate Rx modes that the UE may use for deriving CSI/BSI on the configured CSI-RS QCL resources.

In some embodiments, those Rx modes measured with the TRP Tx beams conveyed on the first time unit (comprising X sub-time units) are used for deriving CSI/BSI in subsequent time units.

In some embodiment, a UE can be indicated of the X TRP Tx beam IDs (that are reported in the beam state information based on previous measurement on CSI-RS or BRS) in RRC, MAC-CE or DCI signaling, and the then UE is configured to use the X Rx modes which those TRP Tx beam IDs are QCL'ed to in Rx beams. The X Rx modes are used for deriving CSI/BSI in X sub-time units in each time unit in each CSI-RS resource in a CSI-RS setting; one Rx mode per sub-time unit.

In one example, for a first sub-time unit in every time unit in every CSI-RS resource in the RS setting, a first Rx mode that are QCL with a first TRP Tx beam ID is used for deriving CSI/BSI; for a second sub-time unit in every time unit in every CSI-RS resource in the RS setting, a second Rx mode that are QCL with a second TRP Tx beam ID is used; and so on until x-th sub time unit.

A UE may be indicated with a reference QCL resource for Rx beam QCL across CSI-RS ports and across time units corresponding to multiple CSI-RS resources. The indicated information can be such that all the time units in $M_B$ CSI-RS resources are QCL'ed to a same UE Rx beam(s). An example of is shown in FIG. 13A. As illustrated in FIG. 13A, $M_B$=2 CSI-RS resources 1302 and 1303 are configured to the UE. All the time units in these two CSI-RS resources are QCL'ed to a same set of UE Rx beams. The UE is configured to apply the same Rx beam(s) on the first repetitions of all time units in these two CSI-RS resources, 1361, 1364, 1367, 1371, 1374, land 377.

The UE is configured to apply the same Rx beam(s) on the same-indexed repetitions in all the time units in these two CSI-RS resources. If the repetition numbers of one time unit in two CSI-RS resources are not same, let's take $X_1$<$X_2$ as an example. In one embodiment, the UE may apply the same Rx beams on the first $X_1$ repetitions in each time units of CSI-RS resources 1302 and 1303, and in CSI-RS resource 1303, the UE may apply the same Rx beams on repetition $X_1$+x (x=1,2, . . . , $X_2$−$X_1$) and repetition x (x=1,2, . . . , $X_2$−$X_1$). In another embodiment, the UE may apply the same Rx beams on the first $X_1$ repetitions in each time units of CSI-RS resources 1302 and 1303, and in CSI-RS resource 1303, the UE may apply the Rx beams, which are configured by TRP, on repetition $X_1$+x (x=1,2, . . . , $X_2$−$X_1$) in each time unit.

A UE can be configured the information of Rx beam QCL across time units in the $M_B$ ≥1 CSI-RS resources implicitly or explicitly. In one embodiment, the number of repetitions in time units of CSI-RS resources is used to indicate the Rx beam QCL across time units of CSI-RS resources.

Figure 14:
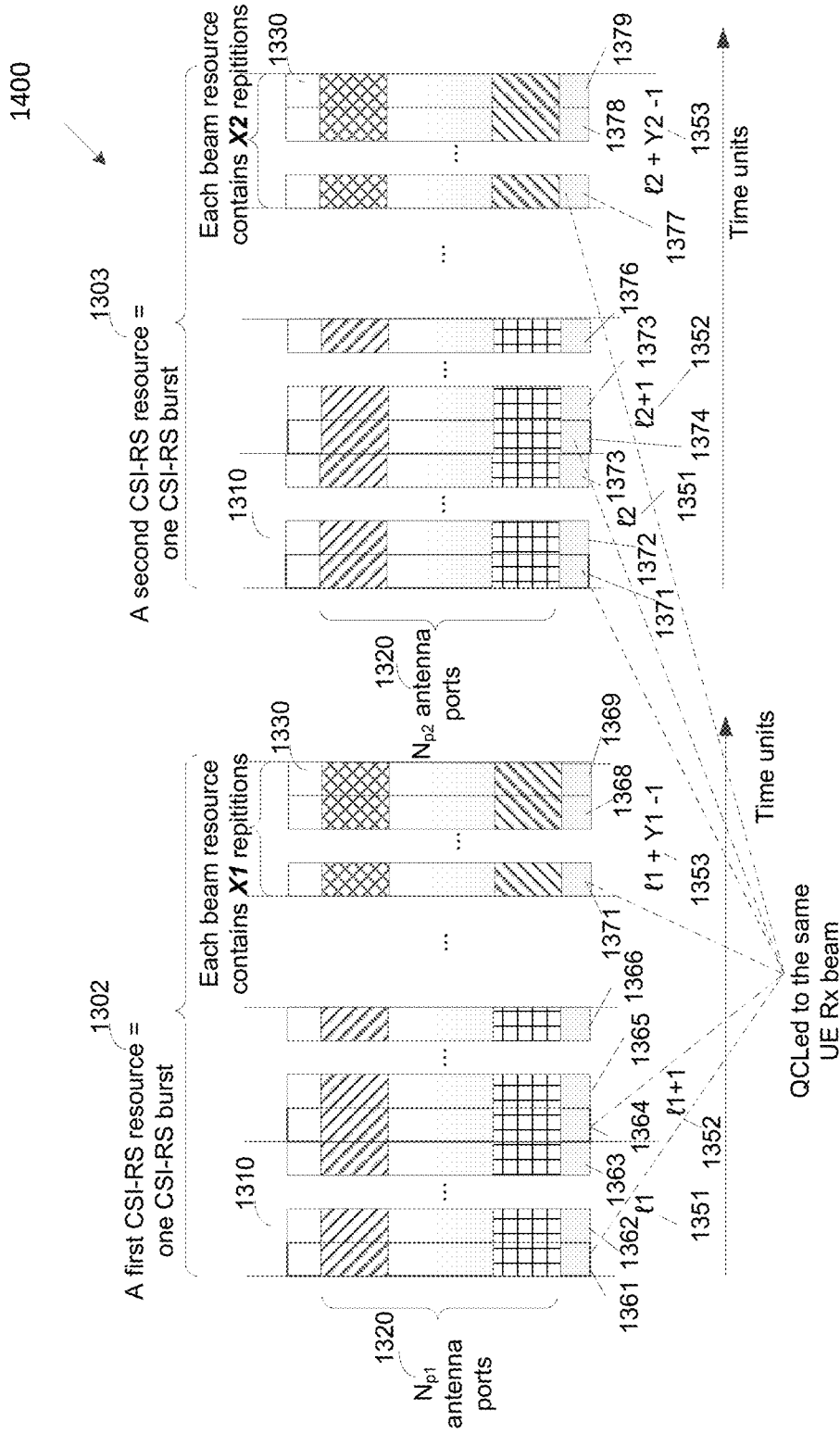
FIG. 14 illustrates example CSI-RS configuration QCL'ed according to embodiments of the present disclosure.

FIG. 14 illustrates example CSI-RS configuration QCL'ed 1400 according to embodiments of the present disclosure. An embodiment of the CSI-RS configuration QCL'ed 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions. Other embodiments are used without departing from the scope of the present disclosure.

In some embodiments, the UE is configured with M CSI-RS resources for beam management and the number of repetitions in those configured CSI-RS resources being equal to each other indicates that the time units in those CSI-RS resources are QCL'ed to a same Rx beam(s). In one example, M=2 CSI-RS resources are configured to the UE. A first CSI-RS resource has $X_1$ repetitions within each time units and a second CSI-RS resource has $X_2$ repetitions within each time units. If $X_1$=$X_2$, the CSI-RS antenna ports or the time units of these two CSI-RS are QCLed to a same UE Rx beams(s), as in the example with $X_1$=$X_2$ shown in FIG. 14.

In some embodiments, one or few bits can be signaled in the CSI-RS resource configuration to indicate the information of Rx beam QCL. These bits can be sent in RRC signal message, MAC-CE or L1 signaling.

In some embodiments, the measurement configuration can include the information of Rx beam IDs that the CSI-RS ports or time units are QCL'ed to in the measurement for the beam state information reporting. If such information is configured, the UE is configured to apply a same Rx beam(s) on the CSI-RS ports or time units in CSI-RS resources.

In one example, the UE is configured with an Rx beam QCL reference resource. The Rx beam QCL reference resource can be N≥1 Tx beam ID reported from previous beam state information reporting based on measurement on BRS, CSI-RS or DMRS. The Rx beam QCL reference resource can be the first $N_B$>=1 beam IDs conveyed in a first CSI-RS resource. The Rx beam QCL reference resource can be the first time unit in a first CSI-RS resource. The Rx beam QCL reference resource can be the first $N_B$>=1 CSI-RS ports in a first time unit in a first CSI-RS resource. The UE is configured to figure out the information of Rx beam(s) for all the time units and CSI-RS ports in $M_B$ CSI-RS resource based on the configured Rx beam QCL reference resource.

Figure 15:
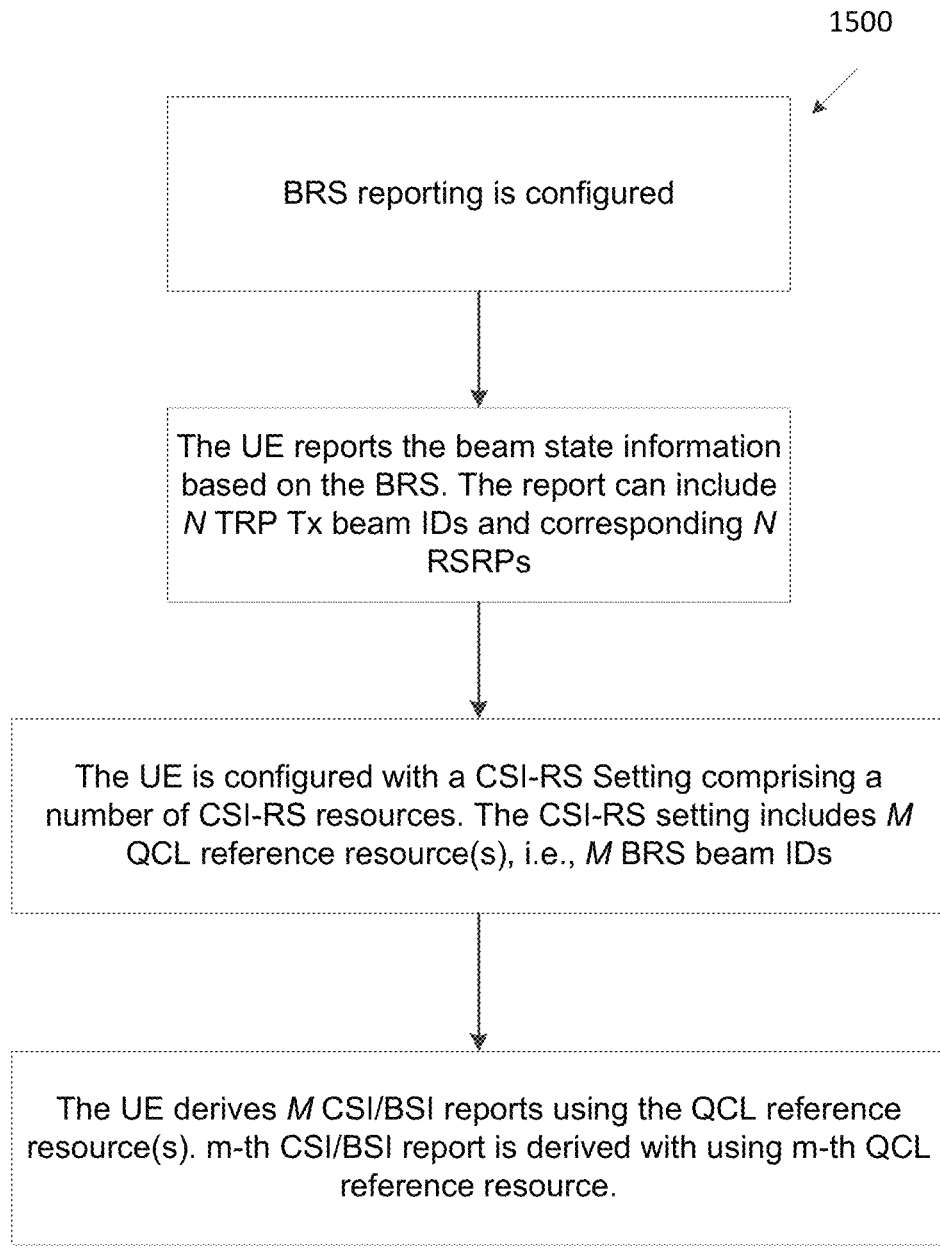
FIG. 15 illustrates an example of a method for beam management according to embodiments of the present disclosure.

FIG. 15 illustrates an example of a method 1500 for beam management according to embodiments of the present disclosure. An embodiment of the method 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions. Other embodiments are used without departing from the scope of the present disclosure.

In one example, the UE is first configured to report N>=1 beam IDs based on the measurement of cell-specific BRS. Then the UE is configured with G CSI-RS resources with X<=N repetitions (sub-time units) in each time unit for Rx beam sweeping, together with X TRP Tx beam IDs of BRS, configured as QCL reference resources for the X sub-time units. The UE is configured to find out the X Rx modes corresponding to the configured TRP Tx beam IDs, so that those Rx modes can be used for Rx beam sweeping across the X sub-time units. A UE is configured to assume that the CSI-RS ports in an x-th sub-time unit across the time units across the CSI-RS resources in the configured CSI-RS setting are QCL'ed in Rx beam/mode with an x-th configured QCL reference resource (or TRP Tx beam ID of BRS). Then, the UE is configured to report Y<=X BSI reports derived with Y Rx modes, wherein each BSI report comprises G pairs of (TRP Tx beam ID of CSI-RS, corresponding beam RSRP), one pair per CSI-RS resource as show in FIG. 15.

In some embodiments, the gNB signals one or more beam measurement configurations to the UE. The beam measurement configuration can include: the indices of CSI-RS resource(s) the UE may use to measure the beam state information; if transmission of CSI-RS resources(s) that is configured to be used by the UE for beam measurement; the uplink resource where the UE is configured to transmit the beam state information, including the uplink data channel allocation or uplink control channel allocation; the beam state information (BSI) reporting configuration; and the QCL reference resource, from which the UE can derive the QCL parameter, for example, the Rx beams(s) for the beam state information measurement and reporting.

In some embodiments of the BSI reporting configuration, the reporting from the UE can comprise a combination of: a set of TRP Tx beam IDs $\{BI_1, BI_2, BI_M\}$, where $BI_1$ is CSI-RS resource #1, $BI_2$ is CSI-RS resource #2, $BI_M$ is CSI-RS resource #M. Those beams are QCL'ed to the same UE Rx beam; the beam-specific RSRP of each beam in reported set $\{BI_1, BI_2, BI_M\}$, wherein the RSRP of each beam-specific RSRP is measured by applying the Rx beam which those TRP Tx beams IDs are QCLed to; he sum of beam-specific RSRP of beam in reported set $\{BI_1, BI_2, BI_M\}$; the beam-specific RSRQ of each beam in reported set $\{BI_1, BI_2, BI_M\}$; or the information of Rx beam QCL of those reported TRP Tx beams, for example the ID of the UE Rx beam(s) that those TRP Tx beam IDs are QCLed to.

In some embodiments, the UE can be configured to report more than one set of TRP Tx beams. The reporting from the UE can comprise a combination of: more than one sets of TRP Tx beams $S_i=\{BI_{11}, BI_{12}, \ldots, BI_{1M}\}$, $S_2=\{BI_{21}, BI_{22}, \ldots, BI_{2M}\}$, ... wherein in each set $S_i$, the beam ID $BI_{i1}$ is from a first CSI-RS resource, the beam ID $BI_{i2}$ is from a second CSI-RS resource; in each set $S_i$, the first beam ID $BI_{i1}$ is the Rx beam QCL reference resource for all the other beam IDs in same set; for each set $S_i$, the information of Rx beams of the QCL information of the QCL reference resource in that set; or in each set, the TRP Tx beam IDs are QCLed to the same UE Rx beam. Across different reporting set, the beams can be QCLed to the same Rx beam or different Rx beams.

In the aforementioned embodiments, one beam ID is each reported set is the QCL reference resource for all TRP Tx beam IDs in that set. It may be called a constrained condition or constrained measurement.

In some embodiments, the BSI reporting configuration, the reporting from the UE can comprise a combination of: one or more TRP Tx beam IDs from each CSI-RS resource, which has the largest beam-specific RSRP; the beam-specific RSRP of reported TRP beam; one or more TRP Tx beam IDs from each CSI-RS resource, which has the largest beam-specific RSRQ; for beam-specific RSRQ of each reported TRP beam; for each reported TRP Tx beam ID, reporting the ID of UE Rx beam that each reported TRP Tx beam ID is QCL'ed to. In such embodiments, the TRP Tx beam IDs reported in the beam state information are not required to be QCL'ed to the same Rx beam. It is called a non-constrained measurement.

The constrained measurement is useful for the transmission scheme of message being sent from multiple TRP Tx beams. In one example, the data is sent from multiple TRP to one UE through SFN method. For this, the multiple Tx beams from different TRPs may be received by the UE with same Rx beam simultaneously. So those beams are QCL'ed to the same UE Rx beam. Another example is the non-coherent JT transmission. Multiple TRP transmit different layers or codewords of data to one UE. In such instance, the UE may also be able to receive the different TRP Tx beams from different TRPs with same Rx beam(s). So the beams used in non-coherent JT may be QCL'ed to the same UE Rx beam and reported by the UE based on constraint measurement.

The non-constrained measurement is useful to obtain the "best" Tx beams of different TRPs. For example, in the transmission mechanism of dynamic point selection (DPS), the UE reports the best beam for each TRP and the gNB would select the best TRP and then use the UE's Tx beam to transmit data to the UE.

In one example, two CSI-RS resources are configured to the UE, a first CSI-RS resource and a second CSI-RS resource. If the constraint measurement is configured to the UE, the beam state information the UE reports can comprise a combination of: a beam pair $\{BI_1, BI_2\}$, where $BI_1$ is conveyed in a first CSI-RS resource and $BI_2$ is conveyed in a second CSI-RS resource; $BI_i$ is the Rx beam QCL reference resource for $BI_2$; the UE Rx beam ID that $BI_1$ and $BI_2$ are QCL'ed to; or the beam-specific RSRP of $BI_1$ and $BI_2$.

In such example, the beam state information the UE reports can comprise a combination of: multiple beam pairs $\{BI_{11}, BI_{12}\}, \{BI_{21}, BI_{22}\}, \ldots$, wherein $BI_{i1}$ is conveyed in a first CSI-RS resource and $BI_{i2}$ is conveyed in a second CSI-RS resource; in each beam pair $\{BI_{i1}, BI_{i2}\}$ with i=1, 2, ..., the $BI_{i1}$ is the Rx beam QCL reference resource to $BI_{i2}$; for each beam pair $\{BI_{i1}, BI_{i2}\}$ with i=1, 2, ..., the UE Rx beam ID that $BI_{i1}$ and $BI_{i2}$ are QCL'ed to; or the beam-specific RSRP of $BI_{i1}$ and $BI_{i2}$ of each beam pair.

If the non-constrained measurement is configured to the UE, the beam state information the UE reports can comprise a combination of: $N_1$ TRP Tx beam IDs from the beams conveyed by a first CSI-RS, the ID of UE Rx beam that each of reported TRP Tx beam IDs is QCL'ed to; $N_2$ TRP Tx beam IDs from the beams conveyed by a second CSI-RS, the ID of UE Rx beam that each of the reported TRP Tx beam ID is QCLed to; the beam-specific RSRP or RSRQ of each reported beam ID; or the value of $N_1$ can 1 or more. The value of $N_2$ can 1 or more. $N_1$ can be equal to $N_2$. $N_1$ can be unequal to $N_2$.

In some embodiments, a UE can be indicated to report by DCI or MAC CE or RRC according to one of the following configurations: one constrained measurement configuration; one non-constrained measurement configuration; or one constrained measurement configuration and one non-constrained measurement configuration.

Figure 16:
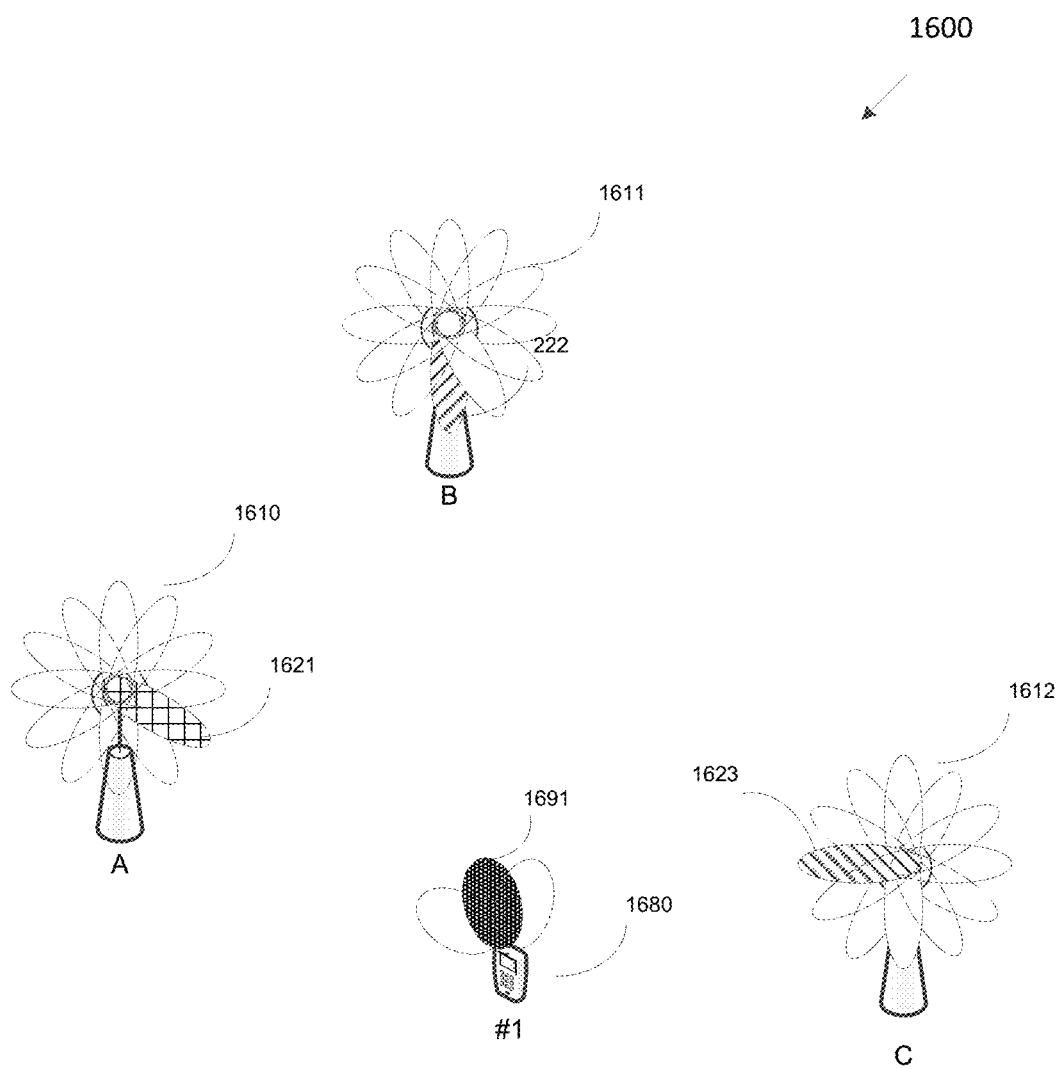
FIG. 16 illustrates an example network configuration according to embodiments of the present disclosure.

FIG. 16 illustrates an example network configuration 1600 according to embodiments of the present disclosure. An embodiment of the network configuration 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions. Other embodiments are used without departing from the scope of the present disclosure.

In 5G NR systems, there is need for PDCCH or transmission on control channel being robust to the beam variation and blockage. In multi-beam based 5G NR systems, one way to boost the robustness of control channel transmission is to transmit PDCCH with multiple beam diversity. An example is shown in FIG. 16. As illustrated in FIG. 16, one gNB contains multiple TRPs and each TRP has multiple Tx beams. The gNB uses three TRPs 1610, 1611 and 1612 to transmit the PDCCH to the UE #1 1680. The PDCCH to the UE 1680 is transmitted by beam 1621 of TRP 1610, beam 1622 of TRP 1611 and beam 1623 of TRP 1612. The UE 1680 uses UE Rx beam 1691 to receive the PDCCH transmitted by TRP beams 1621, 1622 and 1623. In this manner, the transmission to the UE is delivered with multiple beams from different direction. In case of sudden blockage or failure of some of those TRP beams, the PDCCH can still be received successfully from those beams not being blocked.

Rx beam cycling refers to a receiver operation for which a transceiver utilizes different Rx beams in different time units. Rx beam cycling can be used at both TRP and UE. A UE can be indicated to use Rx beam cycling to receive control channels via RRC, MAC CE or DCI signaling. UE can be indicated to use Rx beam cycling to receive data channels via RRC, MAC CE or DCI signaling. A UE can be indicated to use Tx beam cycling to transmit control channels via RRC, MAC CE or DCI signaling; in this case TRP can use Rx beam cycling. UE can be indicated to use Tx beam cycling to transmit data channels via RRC, MAC CE or DCI signaling; in this case TRP can use Rx beam cycling.

When the UE is indicated to use Rx beam cycling for control channel reception, the UE is configured to apply different Rx beams over different OFDM symbols corresponding to a control region. When the UE is indicated to use Rx beam cycling for control channel reception, the UE can be configured to apply different Rx beams over control channels in different subframes or slots.

In such instance, a control region comprises an N number of OFDM symbols. The UE is further configured to apply N different Rx beams on the N number of OFDM symbols. The UE can be indicated with N Rx beam IDs for the Rx beam cycling across OFDM symbols via RRC, DCI or MAC CE signaling.

In such instance, a UE is configured to keep using the indicated set of N Rx beams across OFDM symbols for control signal reception in subsequent slots/subframes, until another set of N Rx beam indication is received.

Figure 17A:
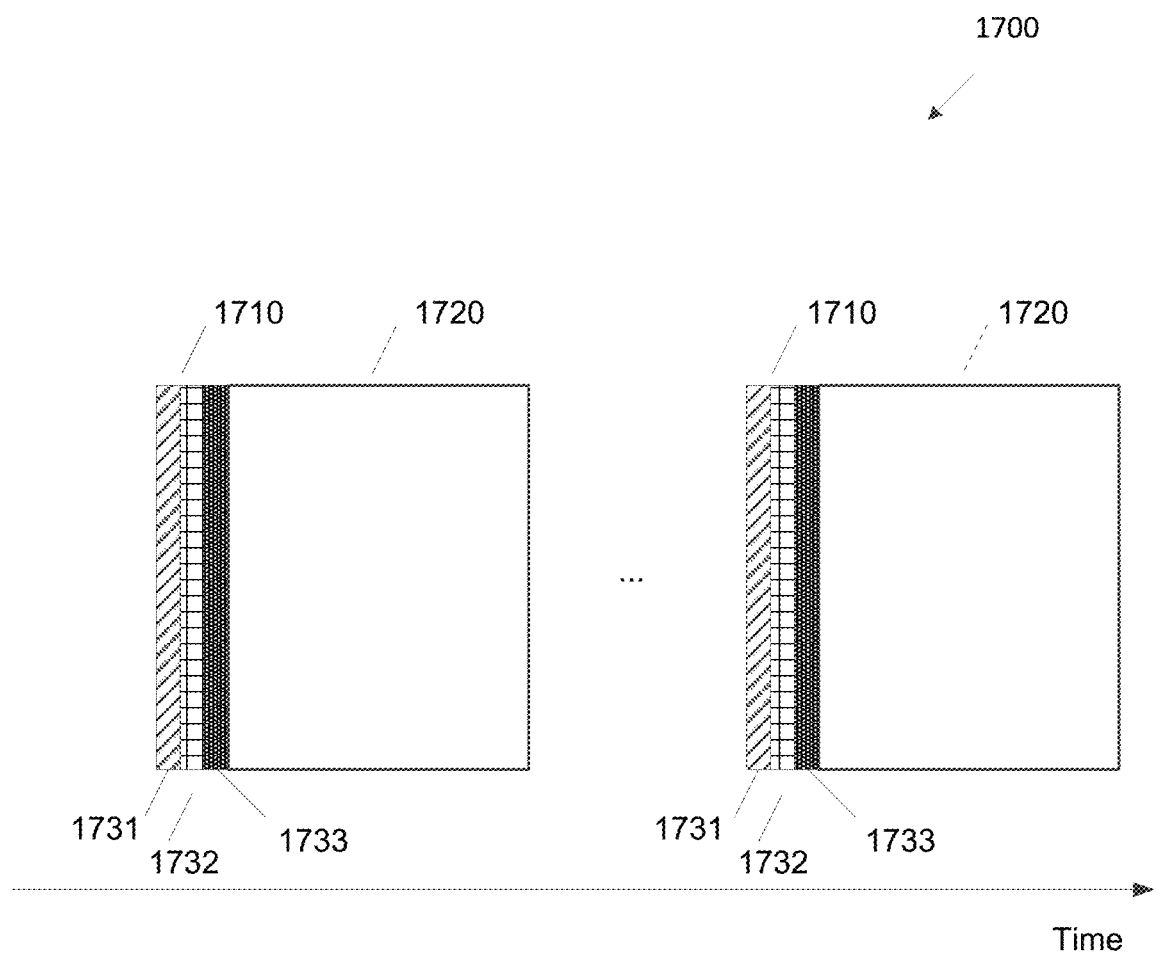
FIG. 17A illustrates an example cyclic Rx beam according to embodiments of the present disclosure.

FIG. 17A illustrates an example cyclic Rx beam 1700 according to embodiments of the present disclosure. An embodiment of the cyclic Rx beam 1700 shown in FIG. 17A is for illustration only. One or more of the components illustrated in FIG. 17A can be implemented in specialized circuitry configured to perform the noted functions or one or more of the components can be implemented by one or more processors executing instructions to perform the noted functions. Other embodiments are used without departing from the scope of the present disclosure.

An example of cycling Rx beam over OFDM symbols is shown in FIG. 17A. As illustrated in FIG. 17A, there are control channel 1710 and data channel 1720. The control channel 1710 can include three OFDM symbols 1731, 1732 and 1733. The UE is configured to cycle the Rx beams over OFDM symbol 1731, 1732, and 1733. And such operation of cycling Rx beams are repeated in multiple subframe for the reception of control channel, as shown in FIG. 17B.

Figure 17B:
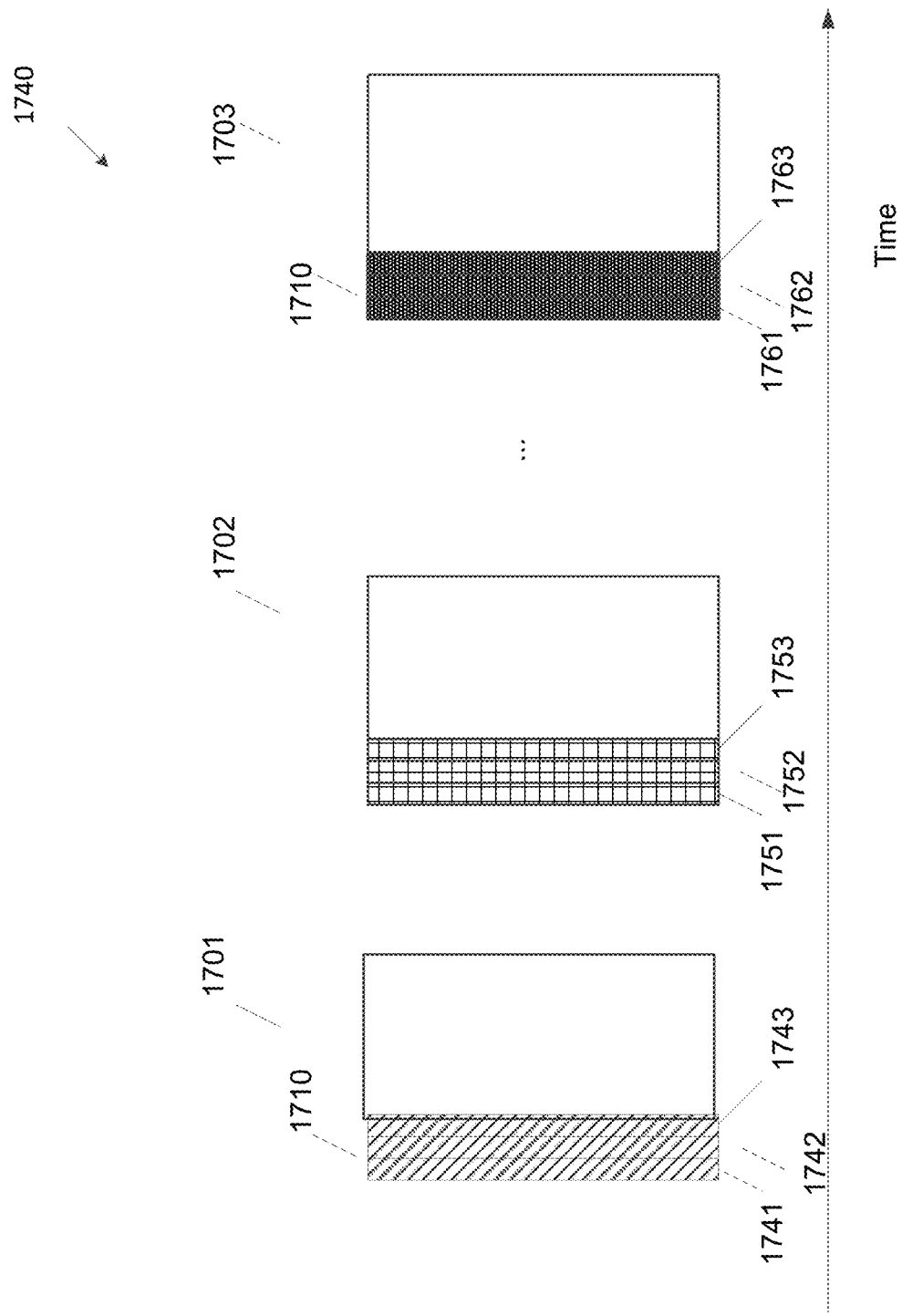
FIG. 17B illustrates another example cyclic Rx beam according to embodiments of the present disclosure.

FIG. 17B illustrates another example cyclic Rx beam 1740 according to embodiments of the present disclosure. An embodiment of the cyclic Rx beam 1700 shown in FIG. 17B is for illustration only. One or more of the components illustrated in FIG. 17B can be implemented in specialized circuitry configured to perform the noted functions or one or more of the components can be implemented by one or more processors executing instructions to perform the noted functions. Other embodiments are used without departing from the scope of the present disclosure. The different hash patterns in FIG. 17B imply different Rx beams.

In some embodiments, a control region comprises an N number of OFDM symbols. The UE is further configured to a same Rx beam on the N number of OFDM symbols. The UE can be indicated with $P_c$ Rx beam IDs for the Rx beam cycling across subframes/slots via RRC, DCI or MAC CE signaling. An example of subframe/slot-level Rx beam cycling is shown in FIG. 17B. As illustrated in FIG. 17B, there are control channel 1710 and data channel 1720 in each subframe/slot. The control channel 1710 can include three OFDM symbols 1731, 1732 and 1733. The UE is configured to use the same Rx beam within each slot/subframe cycle the Rx beams over subframes/slots 1701, 1702, and 1703. The period of cycling Rx beam is also equal to $P_c$ subframes/slots. The different hash patterns in FIG. 17B imply different Rx beams.

Figure 17C:
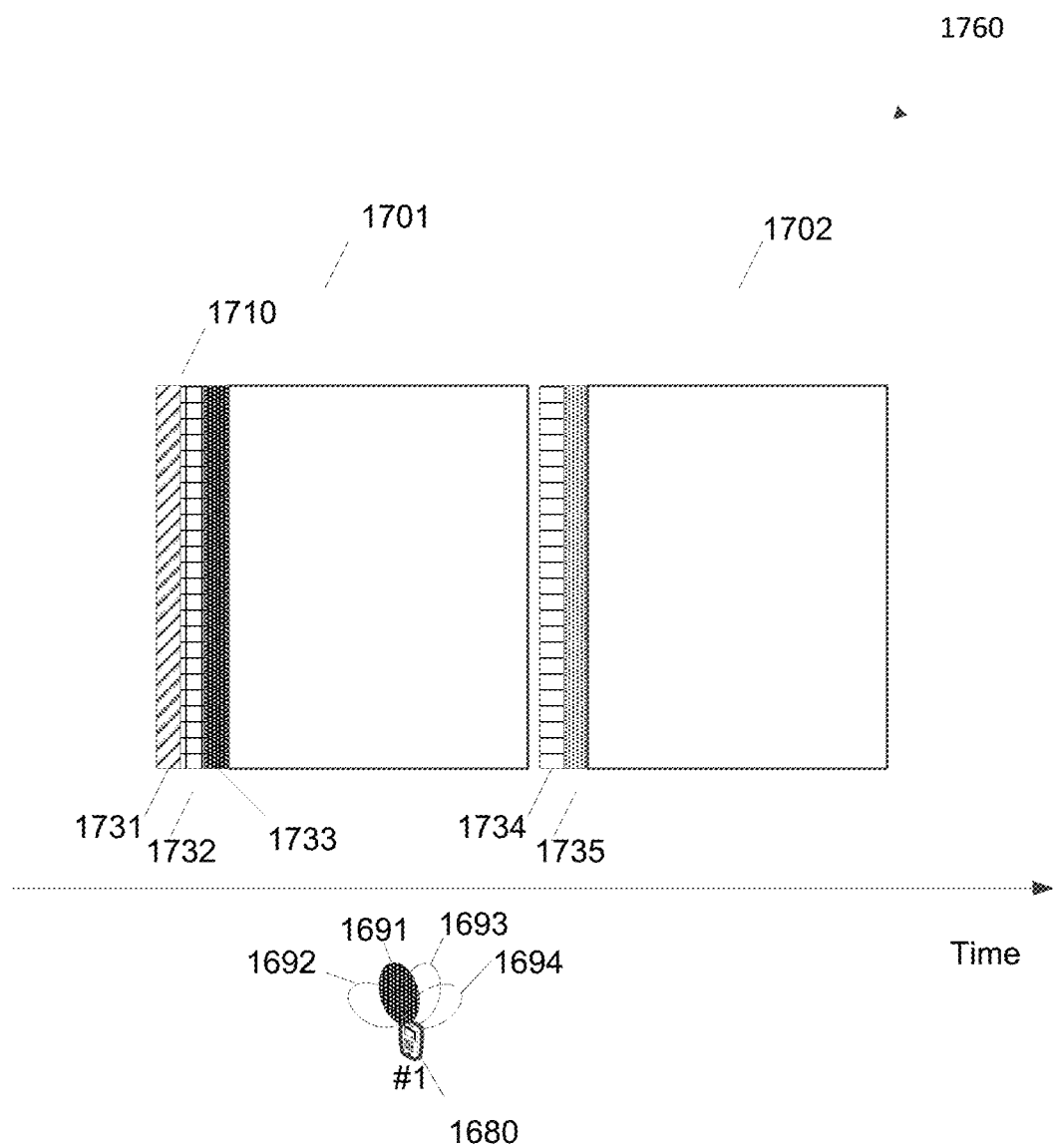
FIG. 17C illustrates yet another example cyclic Rx beam according to embodiments of the present disclosure.

The Rx beam ID to be used for each subframe/slot n can be determined by (Rx beam ID)=mod (n, Pc). In such instance, a UE is configured to keep using the indicated set of $P_c$ Rx beams across subframes/slots for control signal reception in subsequent slots/subframes, until another set of $P_{c0}$ Rx beam indication is received. The value of $P_{c0}$ can be equal to or different from the value of $P_c$. The configuration of Rx beam indication can include: the number of Rx beams $P_{c0}$; the information of Rx beam IDs; the information of starting subframe or slot, in which the UE is configured to start the beam cycling based on this configuration, it can be a subframe or slot index no, it can be a subframe or slot offset l and the starting subframe or slot is the subframe where the configuration is received +l; or then the Rx beam ID to be used for each subframe/slot n can be determined as (Rx beam ID)=mod ($n-n_0$, $P_{c0}$);

FIG. 17C illustrates yet another example cyclic Rx beam 1760 according to embodiments of the present disclosure. An embodiment of the cyclic Rx beam 1700 shown in FIG. 17C is for illustration only. One or more of the components illustrated in FIG. 17C can be implemented in specialized circuitry configured to perform the noted functions or one or more of the components can be implemented by one or more processors executing instructions to perform the noted functions. Other embodiments are used without departing from the scope of the present disclosure.

The UE can be indicated with N Rx beam IDs for the Rx beam cycling across OFDM symbols via RRC, DCI or MAC CE signaling. The UE is configured to N different Rx beams across the OFDM symbols allocated to control signaling, across subframes/slots. In such instance, the UE is configured to cycle the Rx beams over OFDM symbols in control channel and also over different subframes. In such instance, the UE is configured with $Q_l$ Rx beams for cycling. Then the UE is configured to cycle the Rx beams over the OFDM symbols across multiple subframes. An example is shown in FIG. 17C.

The UE is configured with 4 Rx beams 1691, 1692, 1693, and 1694 for cycling. Assume the UE begin the Rx beam cycling from subframe 1701. The UE is configured to apply Rx beam 1691 on OFDM symbol 1731 in subframe 1701, apply Rx beam 1692 on OFDM symbol 1732 in subframe 1701, apply Rx beam 1693 on OFDM symbol 1733 in subframe 1701, then apply Rx beam 1694 on OFDM symbol 1734 in subframe 1702, then the UE cycle back to beam 1691 and apply Rx beam 1691 on OFDM symbol 1735 in subframe 1702. The different hash patterns in FIG. 17C imply different Rx beams.

In another example of FIG. 17C, the UE can be configured to cycling Rx beams 1691 and 1692. In this configuration, the UE can apply Rx beam 1691 on OFDM symbols 1731, 1733, and 1735 and the UE can apply Rx beam 1692 on OFDM symbols 1732 and 1734.

In one embodiment, the control channel can use different subcarrier spacing from the data channel. The subcarrier spacing of control channel OFDM symbol can be R times of the subcarrier spacing of OFDM symbols used by the data channel. The example of R can be 1, 2, 4, 8, . . . In this embodiment, the UE is able to cycle more Rx beams within the control channel. The configuration of R can be used as indication of the Rx beam cycling. In one example, if the value of R is 1, the UE is configured to not do beam cycling and use the first configured Rx beam to receive the control channel; if the value of R is >1, the UE is configured to do beam cycling with the first R beams from the configured Rx beams.

The configuration for Rx beam cycling on control channel can include the followings: the number Rx beams used in beam cycling; the ID of Rx beams used by the UE for beam cycling; the starting subframe or slot where the UE is configured to start the beam cycling based on this configuration; or the mode of Rx beam cycling.

The mode of Rx beam cycling can have three different modes: the UE cycles Rx beams over OFDM symbols within each control channel (mode 1); the UE cycles Rx beams over subframes (mode 2); and the UE cycles the Rx beams over OFDM symbols in control channel and over subframes (mode 3).

The mode of Rx beam cycling for control channel can be configured through implicit or explicit signaling method. In one embodiment, the mode of Rx beam cycling is pre-defined. The mode of Rx beam cycling can be configured through system information message, RRC message, MAC-CE and L1 signaling (DCI).

In some embodiments, the DMRS for PDCCH in control channel can be transmitted on every OFDM symbols in control channel. The configuration of cycling mode can be used as an indication of the configuration of DMRS for PDCCH. If the mode 1 or mode 3 is configured, the DMRS for PDCCH is transmitted on every OFDM symbol in control channel. If the mode 2 is configured, the DMRS for PDCCH can be transmitted on the first OFDM symbol in control channel.

In one example, the gNB indicates a set of one or more UE Rx beam IDs to the UE explicitly. The configuration of UE Rx beam for cycling can include: the number of Rx beams used for beam cycling; the IDs of Rx beams selected for beam cycling; or the information of subframe index in which the UE begins to apply the configured Rx beams for cycling. This can be signaled by a subframe offset or slot offset $n_1$. The UE is configured to apply the new Rx beam cycling after $n_1$ subframes or slots.

Figure 18:
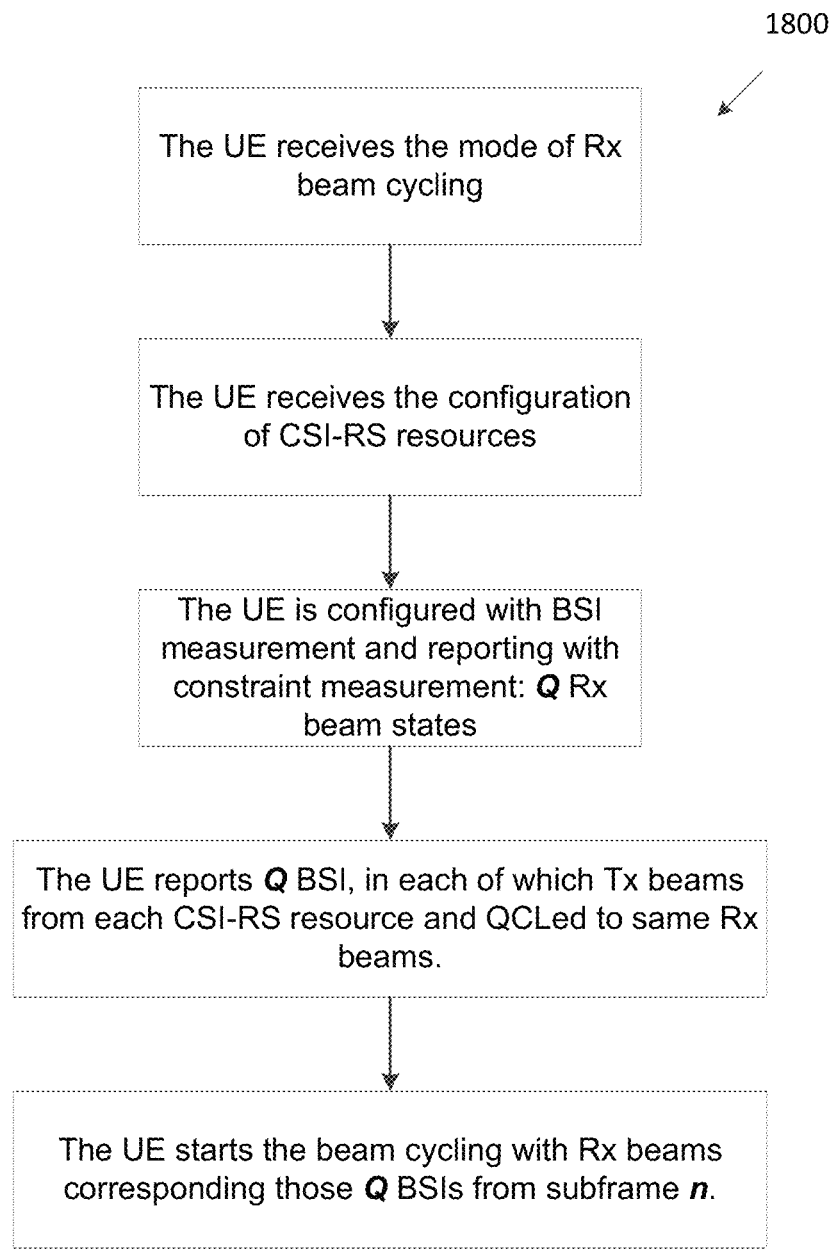
FIG. 18 illustrates an example of a method for cyclic Rx beam operation according to embodiments of the present disclosure.

FIG. 18 illustrates an example of a method 1800 for cyclic Rx beam operation according to embodiments of the present disclosure. An embodiment of the method 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions. Other embodiments are used without departing from the scope of the present disclosure.

In some embodiments, the UE is configured with one or more CSI-RS resources and the UE is configured with a constrained measurement for beam state information reporting. An example procedure is shown in FIG. 18. As illustrated in FIG. 18, the UE first receives the configuration of mode of Rx beam cycling for control channel. Then the UE is configured with one or more CSI-RS resources for beam management. The UE is configured with the beam state information measurement and reporting. The constrained measurement can be included in the configuration. The UE is configured with BSI reporting for Q>=1 Rx beam states. In the reporting, the UE can report Q BSIs. Each BSI can include: a subset of TRP Tx beam IDs, one beam from each CSI-RS resource, which are QCLed to the same Rx beam(s) that correspond to one Rx beam state. Then the UE starts the Rx beam cycling with the Rx beams corresponding to those Q Rx beam states from subframe n.

Figure 19:
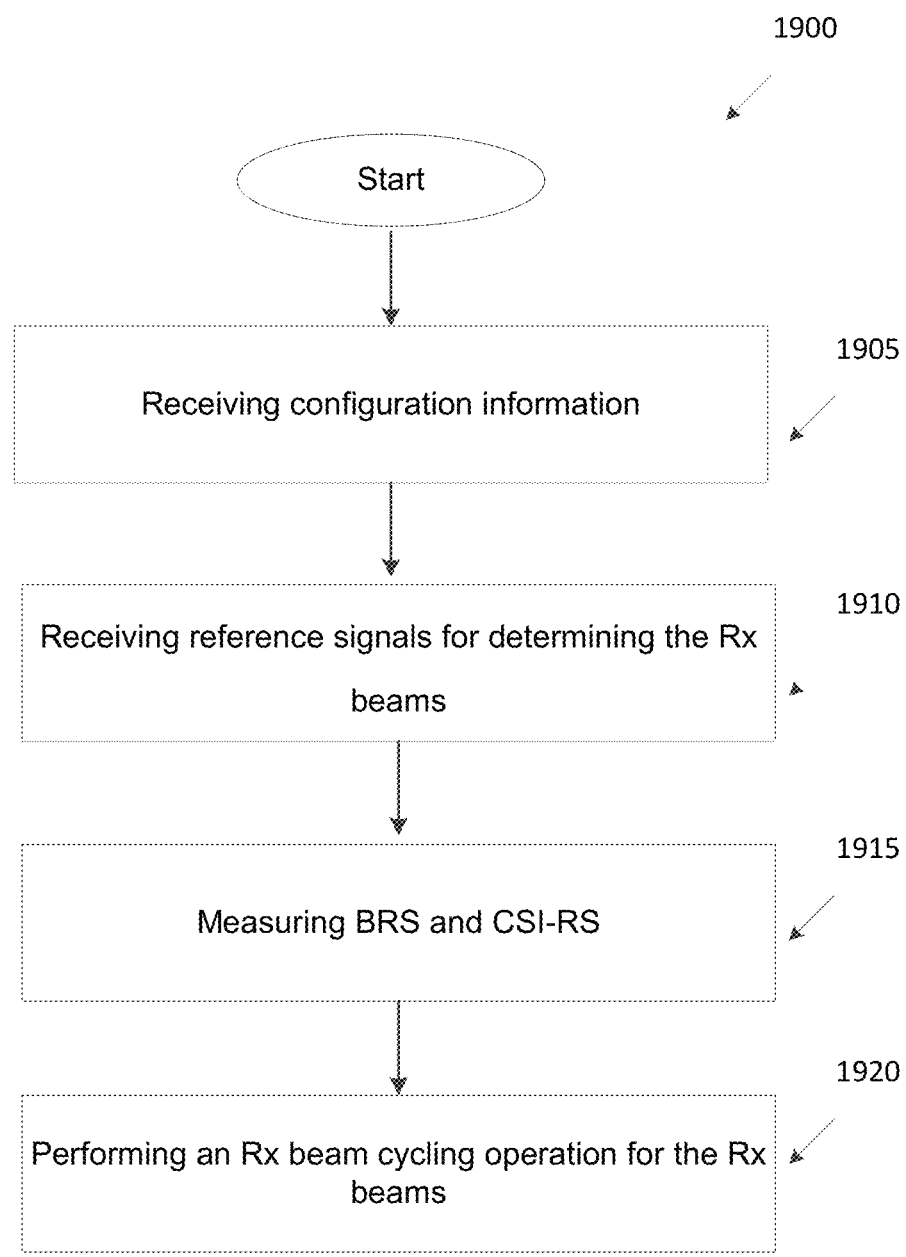
FIG. 19 illustrates another example of a method for cyclic Rx beam operation according to embodiments of the present disclosure.

FIG. 19 illustrates another example of a method 1900 for cyclic Rx beam operation according to embodiments of the present disclosure, as may be performed by a UE (111-116 as shown in FIG. 1). An embodiment of the method 1900 shown in FIG. 19 is for illustration only. One or more of the components illustrated in FIG. 19 can be implemented in specialized circuitry configured to perform the noted functions or one or more of the components can be implemented by one or more processors executing instructions to perform the noted functions. Other embodiments are used without departing from the scope of the present disclosure.

As shown in FIG. 19, the method 1900 begins at step 1905. In step 1905, the UE receives configuration information including information of receive (Rx) beam identifications (IDs) associated with Rx beams. In some embodiments, the UE in step 1905 receives the configuration information including a set of spatial quasi co-location (QCL) parameters associated with a reference signal (RS) resource and a group of RS resources and calculate the Rx beams based on the set of QCL parameters included in the configuration information. In such embodiments, the group of RS resources is spatially QCLed to a QCL reference source.

Next, in step 1910, the UE receives reference signals for determining the Rx beams. In one example, the Rx beams include different Rx beam IDs, respectively. Subsequently, the UE in step 1915, measures, based on the Rx beams, a beam reference signal (BRS) and a channel state information-reference signal (CSI-RS) received from the BS. In one example, the BRS comprises a beam ID that is spatially QCLed with a different RS type and a secondary synchronization signal (SSS). In some embodiments, the UE in step 1910 receives downlink signals conveyed on different slots with different Rx beams. In such embodiments, the different Rx beams include different Rx beam ID, respectively, included in the configuration information and monitors the downlink signals on different slot based on the different Rx beams.

Finally, the UE in step 1920 performs, based on the configuration information, an Rx beam cycling operation for the Rx beams to receive downlink channels. In some embodiments, the UE in step 1920 performs the Rx beam cycling operation over different OFDM symbols that are allocated to control channels and repeats the Rx beam cycling operation in multiple slots for receiving the control channels. In some embodiments, the UE in step 1920 performs the Rx beam cycling operation over different OFDM symbols across multiple slots and repeats the Rx beam cycling operation in the multiple slots for receiving control channels.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A method for operating a user equipment (UE) in a wireless communication system, the method comprising:
   receiving, from a base station, configuration information for indicating whether quasi-co location (QCL) information for a physical downlink shared channel (PDSCH) is indicated in downlink control information (DCI);
   identifying that the QCL information for the PDSCH is indicated in the DCI based on the configuration information;
   receiving, from the base station, the DCI on a physical downlink control channel (PDCCH), the DCI including the QCL information for the PDSCH; and
   receiving, from the base station, a reference signal for the PDSCH based on the QCL information.

2. The method of claim 1, further comprising:
   identifying that the QCL information for the PDSCH is not indicated in the DCI based on the configuration information; and
   determining the QCL information for the PDSCH that is identical to QCL information applied to the PDCCH.

3. The method of claim 1, wherein the configuration information is transmitted from the base station by a radio resource control (RRC) signaling.

4. The method of claim 1, wherein the QCL information comprises at least one of an identification (ID) of at least one reference signal that is quasi-co located to the reference signal for the PDSCH or at least one QCL parameter for the at least one reference signal.

5. The method of claim 4, wherein the at least one reference signal that is quasi-co located to the reference signal for the PDSCH comprises at least one of a channel state information reference signal (CSI-RS) or a synchronization signal.

6. The method of claim 1, further comprising:
   receiving, from the base station, QCL information for the PDCCH;
   identifying an identification (ID) of a signal that is quasi-co located to a reference signal for the PDCCH based on the QCL information for the PDCCH; and
   receiving, from the base station, the reference signal for the PDCCH based on the ID of the signal.

7. The method of claim 1,
   wherein the reference signal for the PDSCH comprises a demodulation reference signal (DM-RS), and
   wherein the receiving the reference signal for the PDSCH based on the QCL information comprises:
   identifying a receive beam corresponding to the DM-RS based on the QCL information for the PDSCH; and
   receiving, from the base station, the DM-RS by using the identified receive beam.

8. A method for operating a base station in a wireless communication system, the method comprising:
   transmitting, to a user equipment (UE), configuration information for indicating whether quasi-co location (QCL) information for a physical downlink shared channel (PDSCH) is indicated in downlink control information (DCI);
   transmitting, to the UE, the DCI on a physical downlink control channel (PDCCH), the DCI including the QCL information for the PDSCH; and
   transmitting, to the UE, a reference signal for the PDSCH based on the QCL information,
   wherein it is identified that the QCL information for the PDSCH is indicated in the DCI based on the configuration information.

9. The method of claim 8, wherein the configuration information is transmitted to the UE by a radio resource control (RRC) signaling.

10. The method of claim 8, wherein the QCL information comprises at least one of an identification (ID) of at least one reference signal that is quasi-co located to the reference signal for the PDSCH or at least one QCL parameter for the at least one reference signal.

11. The method of claim 10, wherein the at least one reference signal that is quasi-co located to the reference signal for the PDSCH comprises at least one of a channel state information reference signal (CSI-RS) or a synchronization signal.

12. The method of claim 8, further comprising:
   transmitting, to the UE, QCL information for the PDCCH; and
   transmitting, to the UE, the reference signal for the PDCCH based on the ID of the signal,
   wherein an identification (ID) of a signal that is quasi-co located to a reference signal for the PDCCH is identified based on the QCL information for the PDCCH.

13. The method of claim 8,
   wherein the reference signal for the PDSCH comprises a demodulation reference signal (DM-RS),
   wherein a receive beam corresponding to the DM-RS is identified by the UE based on the QCL information for the PDSCH, and
   wherein the DM-RS is received by the UE by using the identified receive beam.

14. A user equipment (UE) in a wireless communication system, the UE comprising:
   a transceiver; and
   at least one processor operably coupled to the transceiver, wherein the at least one processor is configured to:
   receive, from a base station, configuration information for indicating whether quasi-co location (QCL) information for a physical downlink shared channel (PDSCH) is indicated in downlink control information (DCI),
   identify that the QCL information for the PDSCH is indicated in the DCI based on the configuration information,
   receive, from the base station, the DCI on a physical downlink control channel (PDCCH), the DCI including the QCL information for the PDSCH, and
   receive, from the base station, a reference signal for the PDSCH based on the QCL information.

15. The UE of claim 14, wherein the at least one processor is further configured to:
- identify that the QCL information for the PDSCH is not indicated in the DCI based on the configuration information, and
- determine the QCL information for the PDSCH that is identical to QCL information applied to the PDCCH.

16. The UE of claim 14, wherein the configuration information is transmitted from the base station by a radio resource control (RRC) signaling.

17. The UE of claim 14, wherein the QCL information comprises at least one of an identification (ID) of at least one reference signal that is quasi-co located to the reference signal for the PDSCH or at least one QCL parameter for the at least one reference signal.

18. The UE of claim 17, wherein the at least one reference signal that is quasi-co located to the reference signal for the PDSCH comprises at least one of a channel state information reference signal (CSI-RS) or a synchronization signal.

19. The UE of claim 14, wherein the at least one processor is further configured to:
- receive, from the base station, QCL information for the PDCCH,
- identify an identification (ID) of a signal that is quasi-co located to a reference signal for the PDCCH based on the QCL information for the PDCCH, and
- receive, from the base station, the reference signal for the PDCCH based on the ID of the signal.

20. The UE of claim 14,
- wherein the reference signal for the PDSCH comprises a demodulation reference signal (DM-RS), and
- wherein the at least one processor, in order to receive the reference signal for the PDSCH based on the QCL information, is further configured to:
  - identify a receive beam corresponding to the DM-RS based on the QCL information for the PDSCH, and
  - receive, from the base station, the DM-RS by using the identified receive beam.

21. A base station in a wireless communication system, the base station comprising:
- a transceiver; and
- at least one processor operably coupled to the transceiver, wherein the at least one processor is configured to:
  - transmit, to a user equipment (UE), configuration information for indicating whether quasi-co location (QCL) information for a physical downlink shared channel (PDSCH) is indicated in downlink control information (DCI),
  - transmit, to the UE, the DCI on a physical downlink control channel (PDCCH), the DCI including the QCL information for the PDSCH, and
  - transmit, to the UE, a reference signal for the PDSCH based on the QCL information, and
- wherein it is identified that the QCL information for the PDSCH is indicated in the DCI based on the configuration information.

22. The base station of claim 21, wherein the configuration information is transmitted to the UE by a radio resource control (RRC) signaling.

23. The base station of claim 21, wherein the QCL information comprises at least one of an identification (ID) of at least one reference signal that is quasi-co located to the reference signal for the PDSCH or at least one QCL parameter for the at least one reference signal.

24. The base station of claim 23, wherein the at least one reference signal that is quasi-co located to the reference signal for the PDSCH comprises at least one of a channel state information reference signal (CSI-RS) or a synchronization signal.

25. The base station of claim 21, wherein the at least one processor is further configured to:
- transmit, to the UE, QCL information for the PDCCH, and
- transmit, to the UE, the reference signal for the PDCCH based on the ID of the signal, and
- wherein an identification (ID) of a signal that is quasi-co located to a reference signal for the PDCCH is identified based on the QCL information for the PDCCH.

26. The base station of claim 21,
- wherein the reference signal for the PDSCH comprises a demodulation reference signal (DM-RS),
- wherein a receive beam corresponding to the DM-RS is identified by the UE based on the QCL information for the PDSCH, and
- wherein the DM-RS is received by the UE by using the identified receive beam.

* * * * *